United States Patent
Zhang et al.

(10) Patent No.: US 11,039,440 B1
(45) Date of Patent: *Jun. 15, 2021

(54) OFDMA WITH BLOCK TONE ASSIGNMENT FOR WLAN

(71) Applicant: NXP USA Inc., Austin, TX (US)

(72) Inventors: Hongyuan Zhang, Fremont, CA (US); Rohit U. Nabar, Sunnyvale, CA (US); Hui-Ling Lou, Sunnyvale, CA (US)

(73) Assignee: NXP USA, INC., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/666,162

(22) Filed: Oct. 28, 2019

Related U.S. Application Data

(63) Continuation of application No. 15/924,573, filed on Mar. 19, 2018, now Pat. No. 10,462,790, which is a
(Continued)

(51) Int. Cl.
*H04W 72/04* (2009.01)
*H04L 5/00* (2006.01)
*H04W 84/12* (2009.01)

(52) U.S. Cl.
CPC ......... *H04W 72/0453* (2013.01); *H04L 5/003* (2013.01); *H04L 5/0007* (2013.01);
(Continued)

(58) Field of Classification Search
CPC ............. H04W 72/0453; H04W 84/12; H04L 5/0007; H04L 5/0023; H04L 5/003; H04L 5/0039; H04L 5/0064; H04L 5/0055
See application file for complete search history.

(56) References Cited

U.S. PATENT DOCUMENTS 5,933,787 A  8/1999  Gilhousen et al.
6,108,782 A  8/2000  Fletcher et al.
(Continued)

OTHER PUBLICATIONS

"IEEE P802.11n™./D3.00, Draft Standard for Information Technology—Telecommunications and information exchange between systems—Local and metropolitanarea networks—Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., Sep. 2007.
(Continued)

*Primary Examiner* — Michael J Moore, Jr.

(57) ABSTRACT

An access point (AP) device assigns respective blocks of orthogonal frequency division multiplexing (OFDM) tones to a plurality of client stations for an orthogonal frequency division multiple access (OFDMA) data unit. The AP device receives respective independent data for the plurality of client stations, and generates a preamble of the OFDMA data unit to include: respective legacy preamble portions in respective sub-channels. Each legacy preamble portion includes a legacy signal field that indicates a duration of the OFDMA data unit, and a non-legacy preamble portion. The AP device also generates a data portion of the OFDMA data unit to include respective independent data for respective client stations. The respective independent data are included within the respective blocks of OFDM tones.

30 Claims, 15 Drawing Sheets

Related U.S. Application Data continuation of application No. 12/730,651, filed on Mar. 24, 2010, now Pat. No. 9,924,512.

(60) Provisional application No. 61/162,780, filed on Mar. 24, 2009.

(52) U.S. Cl.
CPC .......... *H04L 5/0023* (2013.01); *H04L 5/0039* (2013.01); *H04L 5/0064* (2013.01); *H04L 5/0055* (2013.01); *H04W 84/12* (2013.01)

(56) References Cited

U.S. PATENT DOCUMENTS

| | | |
|---|---|---|
| 6,175,743 B1 | 1/2001 | Alperovich et al. |
| 6,377,813 B1 | 4/2002 | Kansakoski et al. |
| 6,654,921 B1 | 11/2003 | Jones et al. |
| 7,599,332 B2 | 10/2009 | Zelst et al. |
| 7,742,390 B2 | 6/2010 | Mujtaba |
| 7,957,474 B2 | 6/2011 | Waters |
| 8,155,138 B2 | 4/2012 | van Nee |
| 8,223,644 B2 | 7/2012 | Tanaka |
| 8,289,869 B2 | 10/2012 | Sawai |
| 8,437,440 B1 | 5/2013 | Zhang et al. |
| 8,526,351 B2 | 9/2013 | Fischer et al. |
| 8,571,010 B1 | 10/2013 | Zhang et al. |
| 8,619,907 B2 | 12/2013 | Mujtaba et al. |
| 8,724,546 B2 | 5/2014 | Zhang et al. |
| 8,724,720 B2 | 5/2014 | Srinivasa et al. |
| 8,867,675 B1 | 10/2014 | Zhang |
| 8,886,755 B1 | 11/2014 | Liu et al. |
| 9,031,044 B2 | 5/2015 | Sampath et al. |
| 9,172,455 B2 | 10/2015 | Wentink et al. |
| 9,237,538 B1 | 1/2016 | Zhang et al. |
| 9,924,512 B1 * | 3/2018 | Zhang .................. H04L 5/0064 |
| 10,038,518 B1 | 7/2018 | Sun et al. |
| 10,462,790 B1 * | 10/2019 | Zhang ............... H04W 72/0453 |
| 2002/0098860 A1 | 7/2002 | Pecen et al. |
| 2002/0145985 A1 | 10/2002 | Love et al. |
| 2004/0057530 A1 | 3/2004 | Tarokh et al. |
| 2004/0066766 A1 | 4/2004 | Shiu et al. |
| 2005/0044473 A1 | 2/2005 | Huang et al. |
| 2005/0047384 A1 | 3/2005 | Wax et al. |
| 2005/0058151 A1 | 3/2005 | Yeh |
| 2005/0276347 A1 | 12/2005 | Mujtaba et al. |
| 2006/0014554 A1 | 1/2006 | Gerlach |
| 2006/0023669 A1 | 2/2006 | Yamaura et al. |
| 2007/0171808 A1 | 7/2007 | Wu et al. |
| 2007/0223469 A1 | 9/2007 | Chandra et al. |
| 2007/0263564 A1 | 11/2007 | Hansen et al. |
| 2008/0075058 A1 | 3/2008 | Mundarath et al. |
| 2008/0084837 A1 | 4/2008 | Watanabe et al. |
| 2008/0095110 A1 | 4/2008 | Montojo et al. |
| 2008/0181323 A1 | 7/2008 | Waters et al. |
| 2008/0298299 A1 | 12/2008 | Thesling |
| 2008/0310363 A1 | 12/2008 | McBeath et al. |
| 2008/0316961 A1 | 12/2008 | Bertrand et al. |
| 2009/0022093 A1 | 1/2009 | Nabar et al. |
| 2009/0022128 A1 | 1/2009 | Nabar et al. |
| 2009/0041144 A1 | 2/2009 | Biswas et al. |
| 2009/0129298 A1 | 5/2009 | Luo et al. |
| 2009/0196163 A1 | 8/2009 | Du |
| 2009/0207765 A1 | 8/2009 | Yamaura |
| 2009/0232234 A1 | 9/2009 | Du |
| 2009/0262696 A1 | 10/2009 | Wei et al. |
| 2009/0316621 A1 | 12/2009 | Lane et al. |
| 2010/0029289 A1 | 2/2010 | Love et al. |
| 2010/0046656 A1 | 2/2010 | van Nee et al. |
| 2010/0061333 A1 | 3/2010 | Marsh et al. |
| 2010/0061334 A1 | 3/2010 | Gault et al. |
| 2010/0074198 A1 | 3/2010 | Morioka |
| 2010/0220601 A1 | 9/2010 | Vermani et al. |
| 2010/0220678 A1 | 9/2010 | Wentink |
| 2010/0238850 A1 | 9/2010 | Abraham et al. |
| 2010/0246399 A1 | 9/2010 | Abraham et al. |
| 2010/0246498 A1 | 9/2010 | Lim et al. |
| 2010/0248630 A1 | 9/2010 | Abraham et al. |
| 2010/0260114 A1 | 10/2010 | Vermani et al. |
| 2010/0260159 A1 | 10/2010 | Zhang et al. |
| 2010/0284393 A1 | 11/2010 | Abraham et al. |
| 2010/0309834 A1 | 12/2010 | Fischer et al. |
| 2010/0309868 A1 | 12/2010 | Yang et al. |
| 2011/0002219 A1 | 1/2011 | Kim et al. |
| 2011/0038332 A1 | 2/2011 | Liu et al. |
| 2011/0059762 A1 | 3/2011 | Jones, IV et al. |
| 2011/0096796 A1 | 4/2011 | Zhang et al. |
| 2011/0103352 A1 | 5/2011 | Wentink |
| 2011/0116485 A1 | 5/2011 | Olszewski et al. |
| 2011/0188482 A1 | 8/2011 | Vermani et al. |
| 2011/0235596 A1 | 9/2011 | Wentink |
| 2012/0300754 A1 | 11/2012 | Rosenqvist et al. |
| 2015/0146653 A1 | 5/2015 | Zhang et al. |

OTHER PUBLICATIONS

"IEEE Std. 802.11n.™. IEEE Standard for Information Technology—Telecommunications and information exchange between systems—Local and metropolitan area networks—Specific requirements, Part 11: Wireless LAN Medium Access Control (MAC) and Physical-Layer (PHY) Specifications: Amendment 5: Enhancements for Higher Throughput," The Institute of Electrical and Electronics Engineers, Inc., Oct. 2009.

Cariou et al., "Multi-channel Transmissions," Doc. No. IEEE 802.11-09/1022r0, *The Institute of Electrical and Electronics Engineers, Inc.*, pp. 1-13 (Sep. 2009).

Chen, "Home Network Basis: Transmission Environments and Wired/Wireless Protocols," Prentice Hall, pp. 1-26 (Jul. 2003).

Hiertz, et al., "The IEEE 802.11 Universe," *IEEE Communications Magazine*, pp. 62-70, (Jan. 2010).

IEEE 802.20-PD-06; IEEE P 802.20™ V14, Draft 802.20 Permanent Document; <System Requirements for IEEE 802.20 Mobile Broadband Wireless Access Systems—Version 14>, 24 pages (Jul. 16, 2004).

IEEE P802.16Rev2/D5 (Jul. 2008) (Revision of IEEE Std 802.16-2004 and consolidates material from IEEE Std 802.16e-2005, Std 802.16-2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, pp. 1-1970 (Jun. 2008).

IEEE Std 80211-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-92, (1999) Reaffirmed (Jun. 12, 2003).

IEEE Std 802.11a-1999 (Supplement to IEEE Std 80211-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific require-

(56) References Cited

OTHER PUBLICATIONS ments Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, pp. 1-89 (Sep. 1999).

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, pp. 1-53 (May 2002).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).

IEEE Std 802.16-2004 (Revision of IEEE Std 802.16-2001), "IEEE Standard for Local and metropolitan area networks; Part 16: Air Interface for Fixed Broadband Wireless Access Systems," The Institute of Electrical and Electronics Engineers, Inc., 893 pages (Oct. 1, 2004).

IEEE Std 802.16-2009 (Revision of IEEE Std. 802.16-2004), IEEE Standard for Local and metropolitan area networks: Part 16: Air Interface for Broadband Wireless Access Systems, The Institute of Electrical and Electronics Engineers, Inc., 2082 pages (May 29, 2009).

IEEE Std 802.16a-2003 (Amendment to IEEE Std 802.16-2001) "IEEE Standard for Local and metropolitan area networks: Part 16: Air Interface for Fixed Broadband Wireless Access Systems—Amendment 2: Medium Access Control Modifications and Additional Physical Layer Specifications for 2-11 GHZ," *The Institute of Electrical and Electronics Engineers, Inc.*, pp. 1-292 (Apr. 1, 2003).

IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, The Institute of Electrical and Electronics Engineers, Inc., pp. 1-864 (Feb. 28, 2006).

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).

Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

Mujtaba, "IEEE P802.11—Wireless LANs, TGn Sync Proposal Technical Specification," *The Institute of Electrical and Electronics Engineers, Inc.*, doc.: IEEE 802.11—04/0889r6, pp. 1-131 (May 2005).

Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-946 (2010).

Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), The Institute of Electrical and Electronics Engineers, pp. 207-211 (2009).

Van Nee et al. "The 802.11n MIMO-OFDM Standard for Wireless LAN and Beyond," Wireless Personal Communications, vol. 37, pp. 445-453 (Jun. 2006).

\* cited by examiner

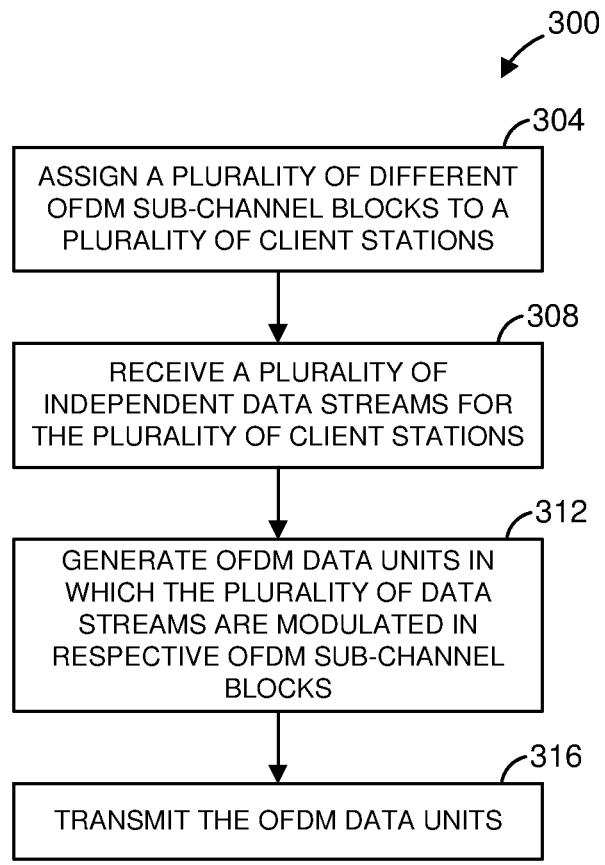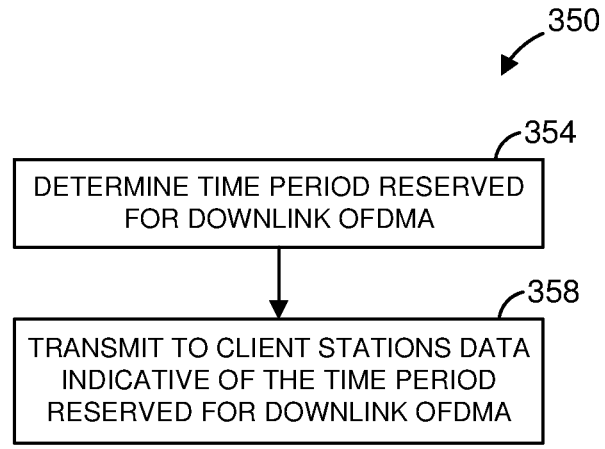

OFDMA WITH BLOCK TONE ASSIGNMENT FOR WLAN

CROSS-REFERENCE TO RELATED APPLICATION

This application is a continuation of U.S. patent application Ser. No. 15/924,573, now U.S. Pat. No. 10,462,790, entitled "OFDMA with Block Tone Assignment for WLAN," filed on Mar. 19, 2018, which is a continuation of U.S. patent application Ser. No. 14/730,651, now U.S. Pat. No. 9,924,512, entitled "OFDMA with Block Tone Assignment for WLAN," filed on Mar. 24, 2010, which claims the benefit of U.S. Provisional Patent Application No. 61/162,780, entitled "Simple OFDMA with Block Tone Assignment for WLAN," filed on Mar. 24, 2009. The disclosures of the applications referenced above are incorporated by reference herein in their entireties.

FIELD OF THE DISCLOSURE

The present disclosure relates generally to communication networks and, more particularly, to wireless local area networks that utilize orthogonal frequency division multiplexing (OFDM).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps.

These WLANs operate in either a unicast mode or a multicast mode. In the unicast mode, the AP transmits information to one client station at a time. In the multicast mode, the same information is transmitted to a group of client stations concurrently.

SUMMARY

In an embodiment, a method for transmitting to a plurality of client stations in a wireless local area network (WLAN) includes: assigning, at an access point (AP) device, respective blocks of orthogonal frequency division multiplexing (OFDM) tones to the plurality of client stations for an orthogonal frequency division multiple access (OFDMA) data unit; receiving, at the AP device, respective independent data for the plurality of client stations; and generating, at the AP device, a preamble of the OFDMA data unit to include: respective legacy preamble portions in respective sub-channels, wherein each legacy preamble portion includes a legacy signal field that indicates a duration of the OFDMA data unit, and a non-legacy preamble portion. The method also includes: generating, at the AP device, a data portion of the OFDMA data unit to include respective independent data for respective client stations, the respective independent data included within the respective blocks of OFDM tones; and transmitting, by the AP device, the OFDMA data unit.

In another embodiment, a wireless communication device comprises: a WLAN network interface device associated with an AP device of a WLAN. The WLAN network interface device comprises one or more integrated circuit (IC) devices, and one or more transceivers. The one or more IC devices are configured to: assign respective blocks of OFDM tones to the plurality of client stations for an OFDMA data unit, and receive respective independent data for the plurality of client stations. The one or more IC devices are configured to generate a preamble of the OFDMA data unit to include: a respective legacy preamble portion in each sub-channel of a plurality of subchannels, wherein each legacy preamble portion includes a legacy signal field that indicates a duration of the OFDMA data unit, and a non-legacy preamble portion. The one or more IC devices are further configured to: generate a data portion of the OFDMA data unit to include respective independent data for respective client stations, the respective independent data included within the respective blocks of OFDM tones; and control the one or more transceivers to transmit the OFDMA data unit.

In yet another embodiment, a method for communicating with a plurality of client stations in a WLAN includes: transmitting, by an AP device of a WLAN, a synchronization signal to prompt a plurality of client stations of the WLAN to transmit as part of an uplink OFDMA transmission at a time that begins a defined time period after an end of the synchronization signal; and subsequent to transmitting the synchronization signal, receiving, at the AP device, the uplink OFDMA transmission from the plurality of client stations, wherein the OFDMA transmission is responsive to the synchronization signal. The uplink OFDMA transmission includes: respective legacy preamble portions in respective sub-channels, wherein each legacy preamble portion includes a legacy signal field that indicates a duration of the uplink OFDMA transmission, a non-legacy preamble portion, and respective independent data from respective client stations among the plurality of client stations, the respective independent data included within respective blocks of orthogonal frequency division multiplex (OFDM) tones.

In still another embodiment, a wireless communication device comprises: a WLAN network interface device associated with an AP device of a WLAN. The WLAN network interface device comprises: one or more integrated circuit (IC) devices, and one or more transceivers. The one or more IC devices are configured to: control the one or more transceivers to transmit a synchronization signal to prompt a plurality of client stations of a WLAN to transmit as part of an uplink OFDMA transmission at a time that begins a defined time period after an end of the synchronization signal. The WLAN network interface device is further configured to: subsequent to transmitting the synchronization signal, receive the uplink OFDMA transmission from the plurality of client stations, wherein the OFDMA transmission is responsive to the synchronization signal. The uplink OFDMA transmission includes: respective legacy preamble portions in respective sub-channels, wherein each legacy preamble portion includes a legacy signal field that indicates a duration of the uplink OFDMA transmission, a non-legacy preamble portion, and respective independent data from respective client stations among the plurality of client stations, the respective independent data included within respective blocks of orthogonal frequency division multiplex (OFDM) tones.

BRIEF DESCRIPTION OF THE DRAWINGS

FIG. 8 is a flow diagram of an example method that is implemented by an AP in a WLAN, according to an embodiment;

FIG. 9 is a flow diagram of another example method that is implemented by an AP in a WLAN, according to an embodiment;

DETAILED DESCRIPTION

In embodiments described below, a wireless network device such as an access point (AP) of a wireless local area network (WLAN) transmits independent data streams to multiple client stations simultaneously. In particular, the wireless device utilizes orthogonal frequency division multiplexing (OFDM) and transmits data for the multiple clients in different blocks of OFDM subchannels. Similarly, in embodiments described below, multiple client stations transmit data to an AP simultaneously, in particular, each client station utilizes OFDM and transmits data to the AP in a different block of OFDM subchannels.

Figure 1:
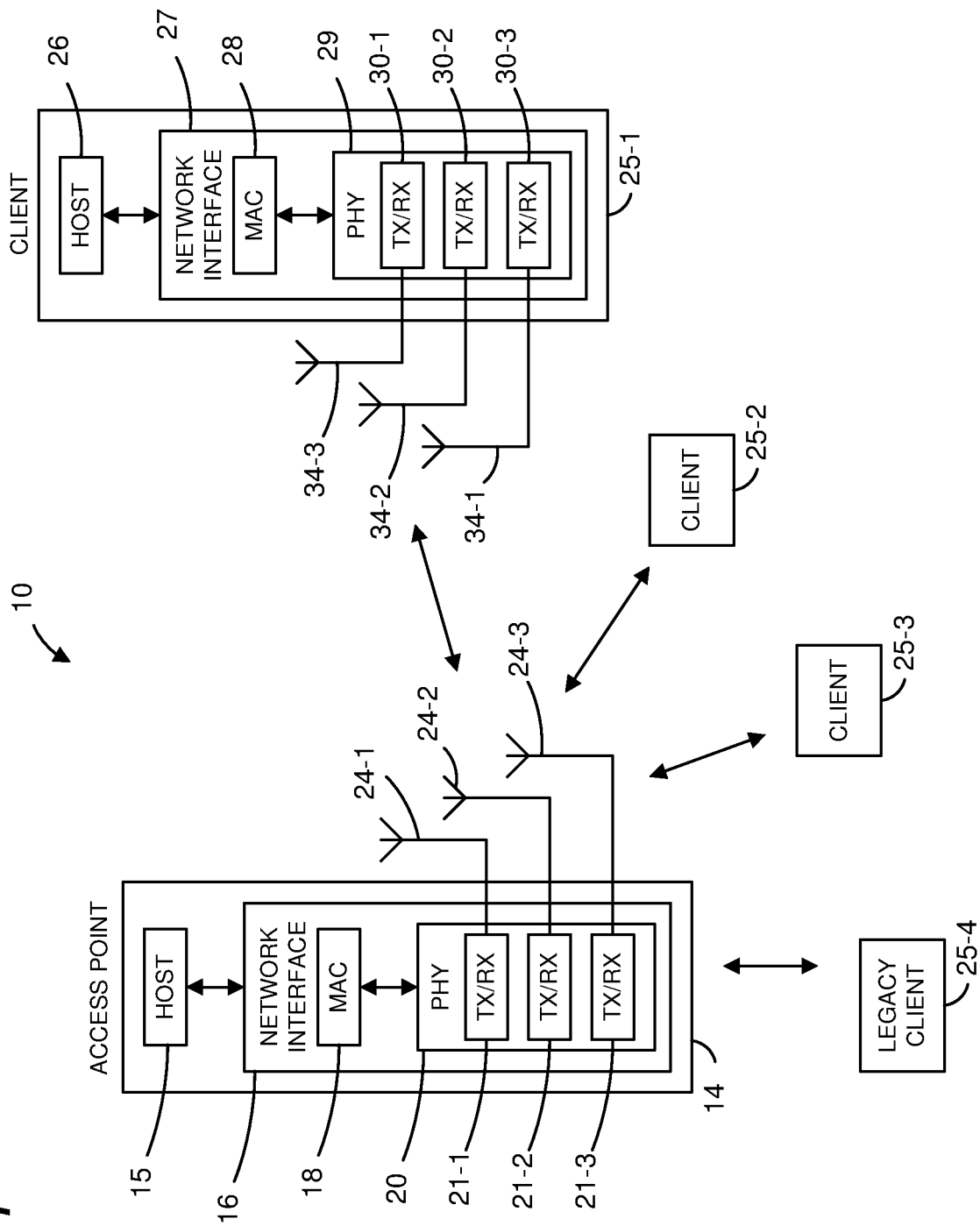
FIG. 1 a block diagram of an example wireless local area network (WLAN) 10, according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) unit 18 and a physical layer (PHY) unit 20. The PHY unit 20 includes a plurality of transceivers 21, and the transceivers are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. Two or more of the client stations 25 are configured to receive corresponding data streams that are transmitted simultaneously by the AP 14. Additionally, two or more of the client stations 25 are configured to transmit corresponding data streams to the AP 14 such that the AP 14 receives the data streams simultaneously.

A client station 25-1 includes a host processor 26 coupled to a network interface 27. The network interface 27 includes a MAC unit 28 and a PHY unit 29. The PHY unit 29 includes a plurality of transceivers 30, and the transceivers are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas, according to an embodiment.

According to an embodiment, the client station 25-4 is a legacy client station that is not enabled to receive a data stream that is transmitted by the AP 14 simultaneously with other independent data streams that are intended for other client stations 25. Similarly, according to an embodiment, the legacy client station 25-4 is not enabled to transmit a data stream that to the AP 24 at the same time that other client stations 25 transmit data to the AP 14. According to an embodiment, the legacy client station 25-4 includes a PHY unit that is generally capable of receiving a data stream that is transmitted by the AP 14 simultaneously with other independent data streams that are intended for other client stations 25. But the legacy client station 25-4 includes a MAC unit that is not enabled with MAC layer functions that support receiving the data stream that is transmitted by the AP 14 simultaneously with other independent data streams that are intended for other client stations 25. According to an embodiment, the legacy client station 25-4 includes a PHY unit that is generally capable of transmitting a data stream to the AP 14 at the same time that other client stations 25 transmit data to the AP 14. But the legacy client station 25-4 includes a MAC unit that is not enabled with MAC layer functions that support transmitting a data stream to the AP 14 at the same time that other client stations 25 transmit data to the AP 14.

In an embodiment, the legacy client station 25-4 operates according to the IEEE 802.11a and/or the IEEE 802.11n Standards. The legacy client station 25-4, when it communicates with the AP 14, occupies an entire communication channel. For example, the IEEE 802.11a Standard defines communication channels each having a width of 20 MHz. When the AP 14 and the legacy client station 25-4 communicate according to the IEEE 802.11a Standard, the AP 14 transmits data to the legacy client station 25-4 in 64 OFDM subchannels that occupy the entire channel, and the legacy client station 25-4 transmits data to the AP 14 in the 64 OFDM subchannels. The IEEE 802.11n Standard defines 20 MHz and 40 MHz communications channels. When the AP 14 and the legacy client station 25-4 communicate according to the IEEE 802.11n Standard using a 20 MHz channel, the AP 14 transmits data to the legacy client station 25-4 in 64 OFDM subchannels that occupy the entire channel, and the legacy client station 25-4 transmits data to the AP 14 in the 64 OFDM subchannels. When the AP 14 and the legacy client station 25-4 communicate according to the IEEE 802.11n Standard using a 40 MHz channel, the AP 14 transmits data to the legacy client station 25-4 in 128 OFDM subchannels that occupy the entire channel, and the legacy client station 25-4 transmits data to the AP 14 in the 128 OFDM subchannels.

According to the IEEE 802.11a and the IEEE 802.11n Standards, different devices share the communication channel by utilizing a carrier sense, multiple access (CSMA) protocol. Generally speaking, CSMA, according to the IEEE 802.11a and the IEEE 802.11n Standards, specifies that a device that wishes to transmit should first check whether another device in the WLAN is already transmitting. If another device is transmitting, the device should wait for a time period and then again check again to see whether the communication channel is being used. If a device detects that the communication channel is not being used, the device then transmits using the channel. With CSMA, in other words, data that is for a particular device (i.e., not multicast data) can only be transmitted on the channel when no other data is being transmitted on the channel.

According to an embodiment, the AP 14 is enabled to transmit different data streams to different client stations 25 at the same time. In particular, the PHY unit 20 is configured to transmit in a communication channel that is wider than specified by the IEEE 802.11a and the IEEE 802.11n Standards. For example, the PHY unit 20 is configured to transmit in one or more of an 80 MHz communication channel, a 120 MHz communication channel, and/or a 160 MHz communication channel, according to an embodiment. As another example, the PHY unit 20 is additionally configured to transmit in one or more of a 200 MHz communication channel, a 240 MHz communication channel, a 280 MHz communication channel, etc., according to an embodiment.

According to an embodiment, the AP 14 is configured to partition the wider communication channel into narrower sub-bands or OFDM sub-channel blocks, and different data streams for different client devices 25 are transmitted in respective OFDM sub-channel blocks. According to an embodiment, each OFDM sub-channel block substantially conforms to the PHY specification of the IEEE 802.11a Standard. According to another embodiment, each OFDM sub-channel block substantially conforms to the PHY specification of the IEEE 802.11n Standard. According to another embodiment, each OFDM sub-channel block substantially conforms to a PHY specification of a communication protocol other than the IEEE 802.11a and the IEEE 802.11n Standards.

As used herein, the phrase "OFDM sub-channel block substantially conforms to the PHY specification" of a communication protocol or standard generally means that a device (configured according to the communication protocol or standard) that receives the transmitted OFDM sub-channel block is able, generally, to detect and decode the data in the OFDM sub-channel block (signal strength, signal-to-noise (SNR), interference, etc., permitting). For example, an OFDM sub-channel block that substantially conforms to the PHY specification of a communication protocol or standard utilizes the modulation, tone mapping, pilot locations, etc., set forth in the communication protocol or standard, although other aspects of the OFDM sub-channel block do not conform to the PHY specification, according to an embodiment. For example, there may be more zero tones at the edges of an OFDM sub-channel block, reduced power (by frequency domain power allocation) at edge tones, etc., than called for by the communication protocol or standard. Similarly, a used herein, the phrase "a device configured to substantially conform to the PHY specification" of a communication protocol or standard generally means that the device is able to detect and decode a signal that conforms or an OFDM sub-channel block that substantially conforms to the communication protocol or standard (signal strength, signal-to-noise (SNR), interference, etc., permitting). The phrase "a device configured to substantially conform to the PHY specification" of a communication protocol or standard also generally means that the device is able to generate a signal that conforms or an OFDM sub-channel block that substantially conforms to the communication protocol or standard.

When an OFDM sub-channel block substantially conforms to the PHY specification of the IEEE 802.11a Standard, for example, a client device 25 corresponding to the OFDM sub-channel block utilizes a PHY unit 29 configured (or substantially configured) according to the IEEE 802.11a Standard to receive the data stream transmitted in the OFDM sub-channel block. When an OFDM sub-channel block substantially conforms to the PHY specification of the IEEE 802.11n Standard, for example, a client device 25 corresponding to the OFDM sub-channel block utilizes a PHY unit 29 configured (or substantially configured) according to the IEEE 802.11n Standard to receive the data stream transmitted in the OFDM sub-channel block.

According to an embodiment, each OFDM sub-channel block includes a contiguous block of OFDM sub-channels or tones that can be demodulated at the client station using a fast Fourier transform (FFT) with a width the size of the OFDM sub-channel block. In other words, according to this embodiment, the OFDM sub-channels assigned to client stations are not interleaved such as in the Wi-Max standard.

Figures 2A, 2B, 2C:
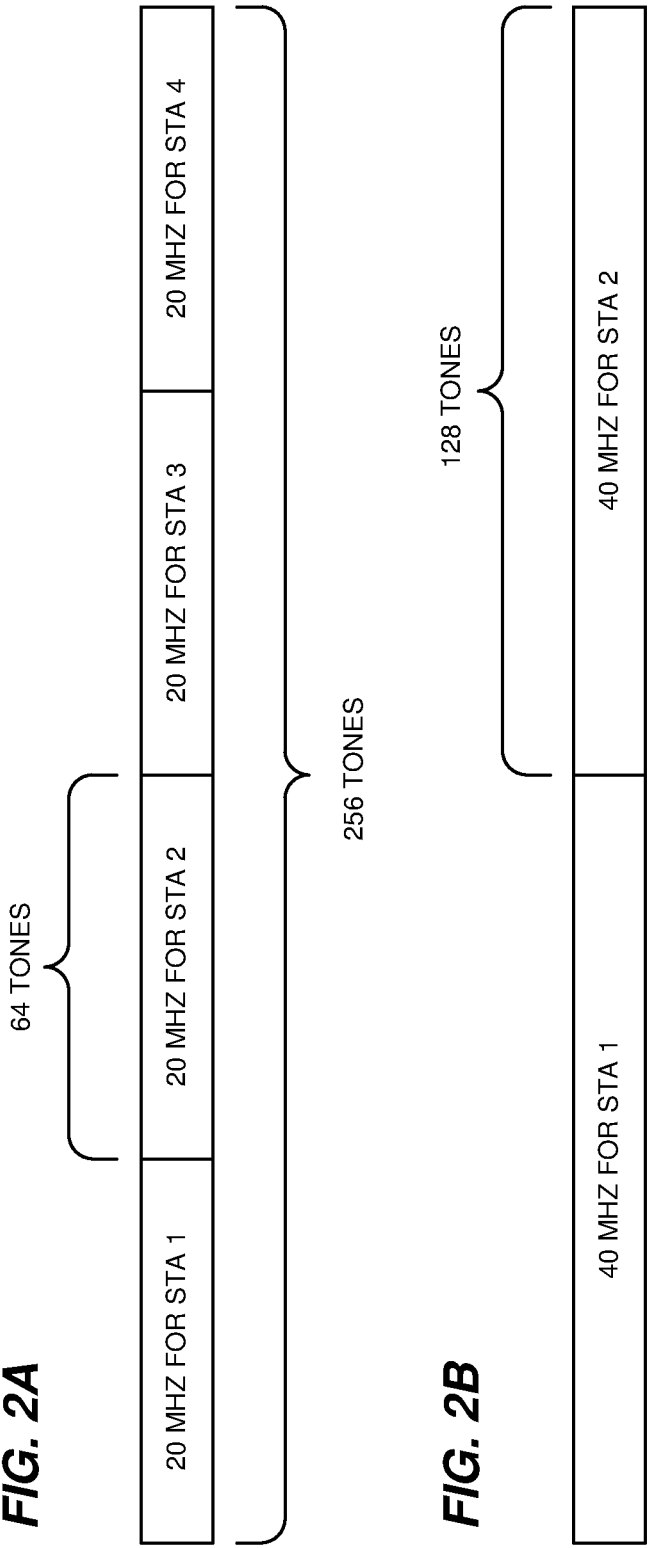
FIGS. 2A, 2B, and 2C are diagrams illustrating example orthogonal frequency division multiplexing (OFDM) sub-channel blocks for an 80 MHz communication channel, according to an embodiment.

FIGS. 2A, 2B, and 2C are diagrams illustrating example OFDM sub-channel blocks for an 80 MHz communication channel, according to an embodiment. In FIG. 2A, the communication channel is partitioned into four contiguous OFDM sub-channel blocks, each having a bandwidth of 20 MHz. The OFDM sub-channel blocks include independent data streams for four client stations. In FIG. 2B, the communication channel is partitioned into two contiguous OFDM sub-channel blocks, each having a bandwidth of 40 MHz. The OFDM sub-channel blocks include independent data streams for two client stations. In FIG. 2C, the communication channel is partitioned into three contiguous OFDM sub-channel blocks. Two OFDM sub-channel blocks each have a bandwidth of 20 MHz. The remaining OFDM sub-channel block has a bandwidth of 40 MHz. The OFDM sub-channel blocks include independent data streams for three client stations.

Although in FIGS. 2A, 2B, and 2C, the OFDM sub-channel blocks are contiguous across the communication channel, in other embodiments the OFDM sub-channel blocks are not contiguous across the communication channel (i.e., there are one or more gaps between the OFDM sub-channel blocks). In an embodiment, each gap is at least as wide as one of the OFDM sub-channel blocks. In another embodiment, at least one gap is less than the bandwidth of an OFDM sub-channel block. In another embodiment, at least one gap is at least as wide as 1 MHz. In an embodiment, different OFDM sub-channel blocks are transmitted in different channels defined by the IEEE 802.11a and/or 802.11n Standards. In one embodiment, the AP includes a plurality of radios and different OFDM sub-channel blocks are transmitted using different radios.

Figure 3:
FIG. 3 is a diagram of an OFDM symbol that is partitioned into three OFDM sub-channel blocks for an 80 MHz communication channel.

In an embodiment, for a plurality of data streams transmitted by an AP in different OFDM sub-channel blocks, different data streams are transmitted at different data rates when, for example, signal strength, SNR, interference power, etc., varies between client devices. Additionally, for a plurality of data streams transmitted by an AP in different OFDM sub-channel blocks, the amount of data in different data streams is often different. Thus, one transmitted data stream can end before another. In such situations, the data in an OFDM sub-channel block corresponding to data stream that is ended is set to zero or some other suitable predetermined value, according to an embodiment. FIG. 3 is a diagram of an (n+1)-th OFDM symbol that is partitioned into three contiguous OFDM sub-channel blocks for an 80 MHz communication channel. Two OFDM sub-channel blocks, corresponding to a Station 1 and a Station 3 each have a bandwidth of 20 MHz. The remaining OFDM sub-channel block, corresponding to a Station 2, has a bandwidth of 40 MHz. The OFDM sub-channel blocks include independent data streams for the three stations. The data stream corresponding to Station 2 ended in the n-th OFDM symbol (i.e., the OFDM symbol previous to the (n+1)-th OFDM symbol), whereas the data streams corresponding to Station 1 and Station 2 have not yet ended. Thus, for the (n+1)-th OFDM symbol, data in the OFDM sub-channel block corresponding to a Station 2 is set to zero.

An OFDM signal comprising a plurality of OFDM sub-channel blocks to transmit independent data streams as described above is also referred to herein as an orthogonal frequency division multiple access (OFDMA) signals. According to an embodiment, a WLAN utilizes downlink OFDMA signals and uplink OFDMA signals. Downlink OFDMA signals are transmitted synchronously from a single AP to multiple client stations (i.e., point-to-multipoint). An uplink OFDMA signal is transmitted by multiple clients stations jointly to a single AP (i.e., multipoint-to-point). Frame formats and/or signaling schemes for downlink OFDMA and uplink OFDMA are different, according to some embodiments.

Embodiments of a PHY frame format for downlink OFDMA signals will now be described. In the following embodiments, OFDM sub-channel blocks have a format substantially similar to the PHY format specified in the IEEE 802.11n Standard. In other embodiments, OFDM sub-channel blocks have a format substantially similar to another communication protocol such as the PHY format specified in the IEEE 802.11a Standard or a communication protocol not yet standardized.

Figure 4:
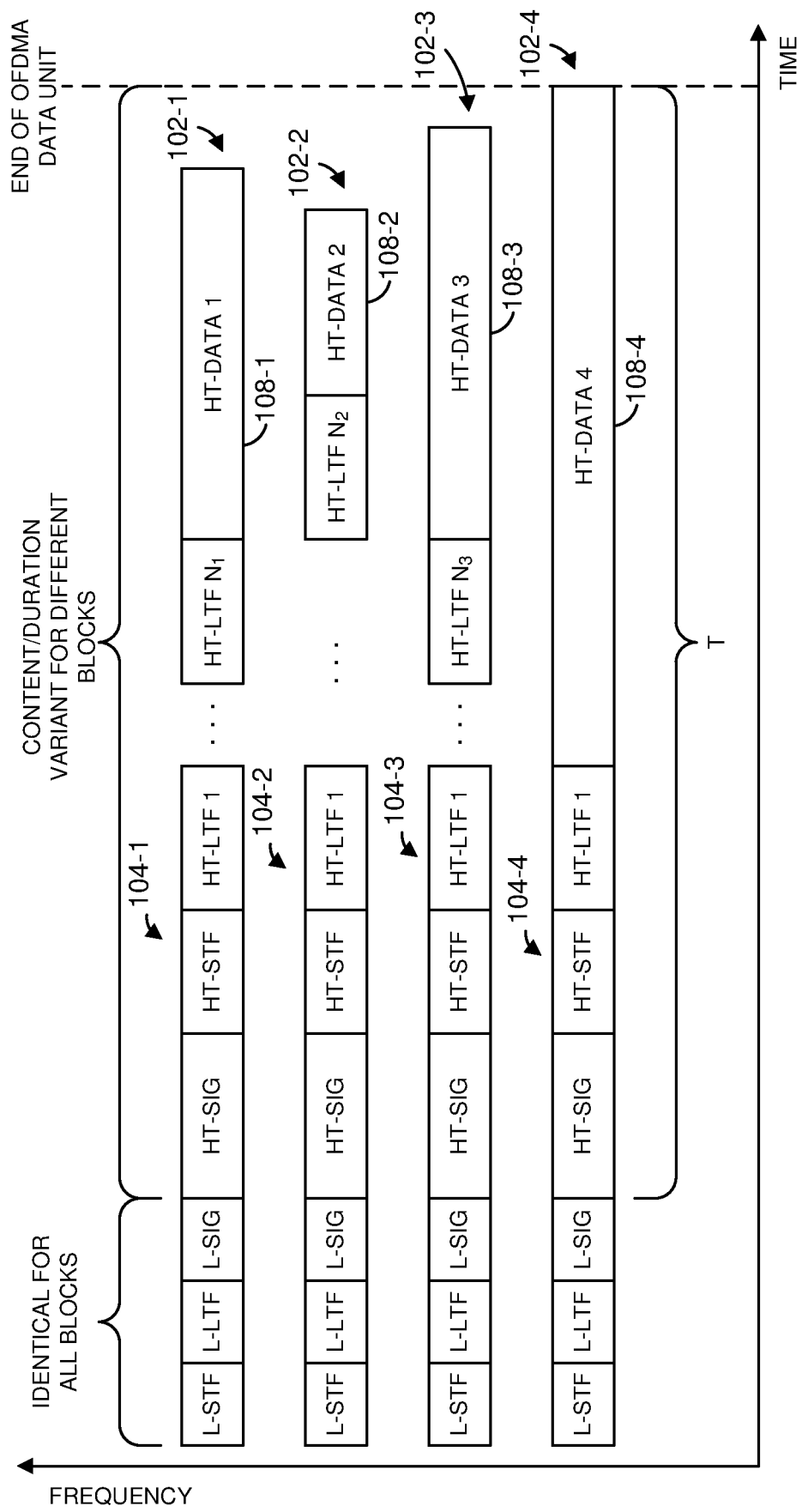
FIG. 4 is a block diagram of an example downlink orthogonal frequency division multiple access (OFDMA) signal, according to an embodiment.

FIG. 4 is a block diagram of an example downlink OFDMA signal 100, according to an embodiment, that is partitioned into four equal-width OFDM sub-channel blocks 102 corresponding to four client stations. In the embodiment of FIG. 4, each OFDM sub-channel block 102 has a format substantially similar to the "mixed mode" data unit PHY format specified in the IEEE 802.11n Standard. For example, each OFDM sub-channel block includes a preamble 104 including a legacy short training field (L-STF), a legacy long training field (L-LTF), a legacy signal (L-SIG) field, a high throughput signal (HT-SIG) field, a high throughput short training field (HT-STF), and one or more high throughput long training fields (HT-LTF). Additionally, each OFDM sub-channel block includes a high throughput data field 108 (HT-DATA). The duration of the high throughput portion of the downlink OFDMA signal 100 is T, which corresponds to the longest of the four OFDM sub-channel blocks 102 (i.e., 102-4). In other words, the durations of the high throughput portions of the OFDM sub-channel blocks 102-1, 102-2, and 102-3 are shorter than the duration of the high throughput portion of the downlink OFDMA signal 100.

The legacy portion of the preamble 104 (i.e., L-STF, L-LTF, and L-SIG) is identical in all of the OFDM sub-channel blocks 102, according to an embodiment. For the high throughput portion of the preamble 104 (i.e., starting with HT-SIG), the content of the OFDM sub-channel blocks 102 can be variant for different client stations depending on factors such as rate, data quantity, configuration (e.g., number of antennas, number of supported multiple input, multiple output (MIMO) data streams, etc.) of different clients.

According to an embodiment, the AP sets the "reserved bit" in each of the L-SIG fields to "1" (the IEEE 802.11a and 802.11n Standards specify that the "reserved bit" in L-SIG to "0") to signal the receiver that the current data unit is a downlink OFDMA signal. Additionally, the AP sets the Length and Rate sub-fields in each off the L-SIG fields to correspond to T, the duration of the high throughput portion of the longest OFDM sub-channel block 102 (i.e., 102-4). According to another embodiment, the AP sets the "reserved bit" in each of the HT-SIG fields to "0" (the IEEE 802.11n Standard specifies that the "reserved bit" in HT-SIG to "1") to signal the receiver that the current data unit is a downlink OFDMA signal.

In other embodiments, the AP signals that a data unit is a downlink OFDMA signal using techniques other than those described above. For example, according to one embodiment, the AP uses MAC layer signaling to reserve a time period for transmitting a downlink OFDMA signal. In this embodiment, MAC layer signaling is utilized to specify the duration T of the downlink OFDMA signal 100. In another embodiment, MAC layer signaling does not specify the duration T of the downlink OFDMA signal 100, but rather specifies different respective times at which respective client stations should send respective acknowledgments of the downlink OFDMA signal 100. In another embodiment, the AP utilizes MAC layer signaling to specify a single time at which all client stations corresponding to the downlink OFDMA signal 100 should simultaneously transmit respective acknowledgments.

In one embodiment, each OFDM sub-channel block 102 in FIG. 4 has a width of 20 MHz. In another embodiment, each OFDM sub-channel block 102 in FIG. 4 has a width of 40 MHz. According to an embodiment, if an OFDM subchannel block has a width of 40 MHz, the legacy portion of the preamble 104 (i.e., L-STF, L-LTF, and L-SIG) is duplicated at upper and lower 20 MHz halves, with the sub-channels in the upper 20 MHz phase shifted by 90 degrees with respect to the sub-channels in the lower 20 MHz.

Figure 5:
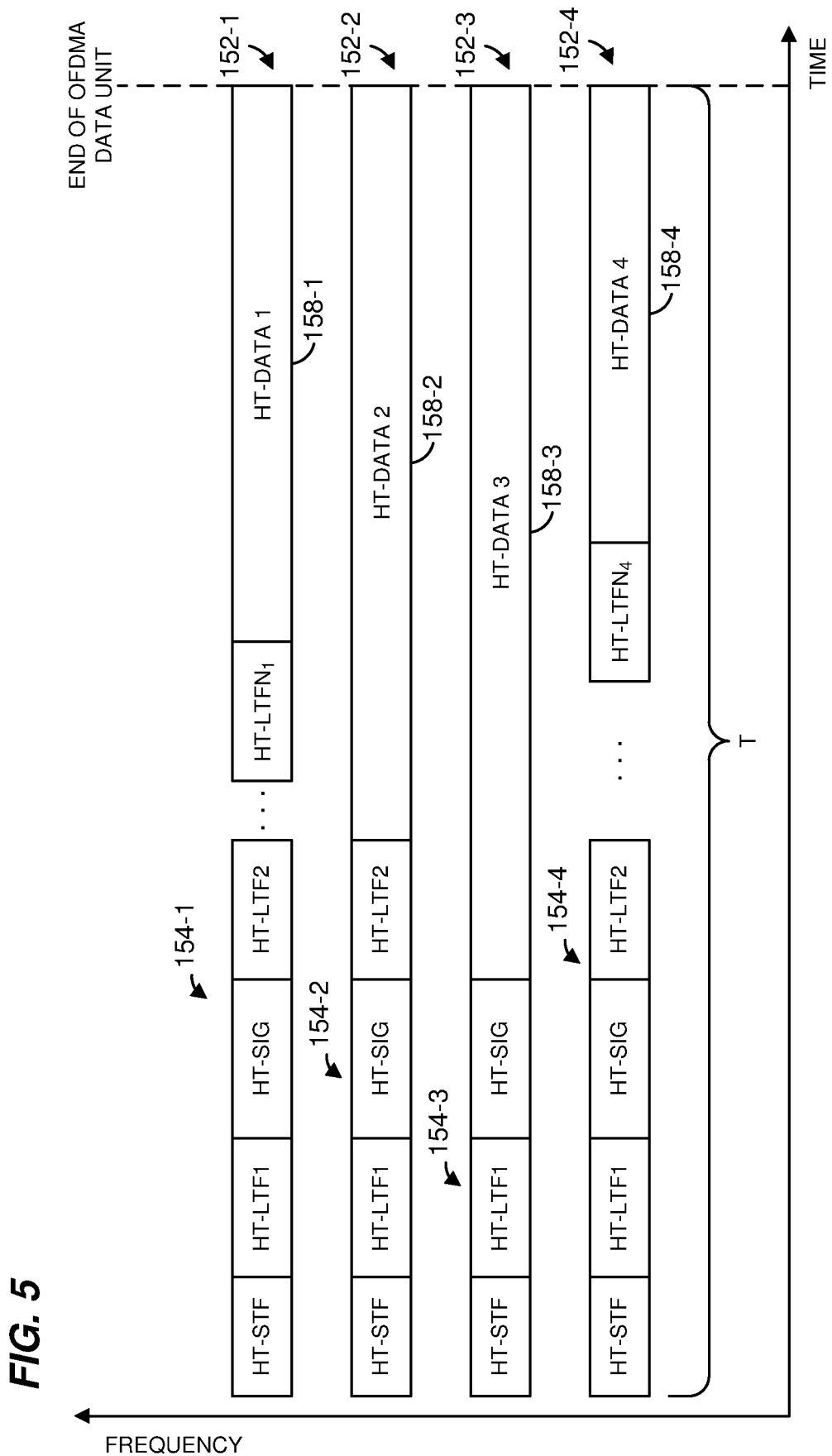
FIG. 5 is a block diagram of an example downlink OFDMA signal, according to another embodiment.

FIG. 5 is a block diagram of an example downlink OFDMA signal 150, according to an embodiment, that is partitioned into four equal-width OFDM sub-channel blocks 152 corresponding to four client stations. In the embodiment of FIG. 5, each OFDM sub-channel block 152 has a format substantially similar to the "Green field mode" data unit PHY format specified in the IEEE 802.11n Standard. For example, each OFDM sub-channel block includes a preamble 154 including an HT-SIG field, and HT-STF field, and one or more HT-LTF fields. Additionally, each OFDM sub-channel block 152 includes a high throughput data field 158 (HT-DATA). The duration of the downlink OFDMA signal 100 is T. The duration of each OFDM sub-channel block 152 is also T. In other words, the AP controls the duration of each OFDM sub-channel block 152 to be T, according to an embodiment. In one embodiment, the AP utilizes zero padding to ensure that each OFDM sub-channel block 152 has a duration of T. In one embodiment, a MAC unit of the AP zero pads one or more MAC service data units (MSDUs) that are included in a MAC protocol data unit (MPDU), which is in turn included in a PHY protocol data unit (PPDU). By zero padding an MSDU, for example, the lengths of the MPDU and the PPDU are increased.

In an embodiment, the AP uses MAC layer signaling to reserve a time period for transmitting the downlink OFDMA signal 150. In one embodiment, MAC layer signaling is utilized to specify the duration T of the downlink OFDMA signal 150. In another embodiment, MAC layer signaling does not specify the duration T of the downlink OFDMA signal 150, but rather specifies different respective times at which respective client stations should send respective acknowledgments of the downlink OFDMA signal 150. In another embodiment, the AP utilizes MAC layer signaling to specify a single time at which all client stations corresponding to the downlink OFDMA signal 150 should simultaneously transmit respective acknowledgments.

In another embodiment, a downlink OFDMA signal includes one or more OFDM sub-channel blocks that have a format substantially similar to the "mixed mode" data unit PHY format specified in the IEEE 802.11n Standard and one or more OFDM sub-channel blocks that have a format substantially similar to the "Green field mode" data unit PHY format specified in the IEEE 802.11n Standard. In one implementation, the AP forms the downlink OFDMA signal so that the duration of each of the OFDM sub-channel blocks is the same. In another implementation, the duration of each of the OFDM sub-channel blocks need not be the same.

In another embodiment, a downlink OFDMA signal includes one or more OFDM sub-channel blocks that conform to a defined communication protocol specification, such as the IEEE 802.11ac Standard now in the process of being adopted, so that each OFDM sub-channel block in the OFDMA data unit forms an OFDM data unit. In some embodiments, information in preambles of OFDM sub-channel blocks of an OFDMA data unit indicate or signals that each OFDM sub-channel block is part of an OFDMA data unit. In an embodiment, such signaling information is included in a suitable preamble field such as a field that is the same as or similar to the L-SIG field and/or the HT-SIG field specified in the IEEE 802.11a and IEEE 802.11n Standards.

Figure 6:
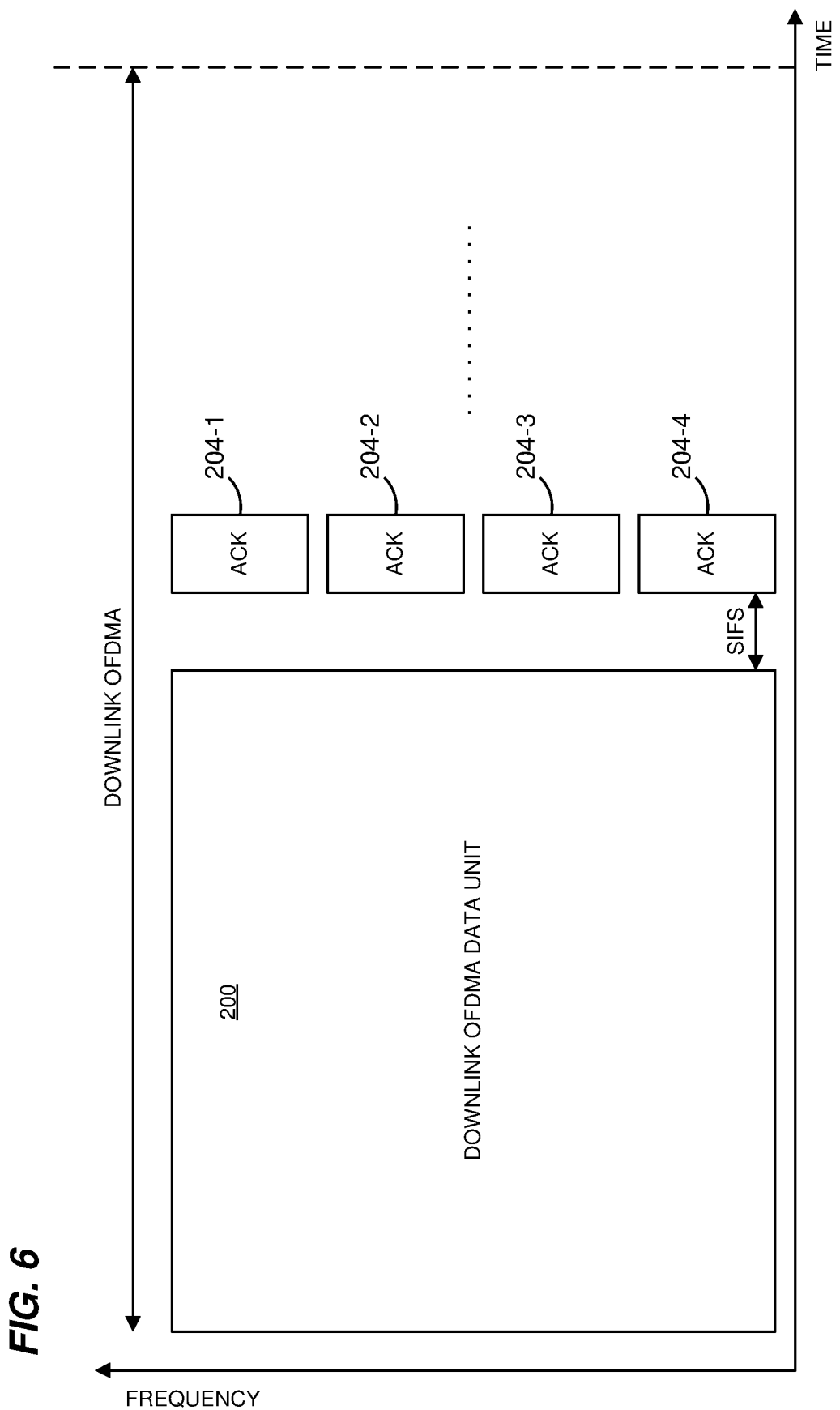
FIG. 6 is a diagram illustrating the transmission of a downlink OFDMA data unit by an access point (AP), and the transmission of acknowledgment signals (ACKs) by client stations in response to the downlink OFDMA data unit, according to an embodiment.

In some embodiments, client stations respond with an acknowledgment signal (ACK) or a negative ACK signal (NAK) after the AP transmits each downlink OFDMA data unit or after the AP transmits a plurality of downlink OFDMA data units (referred to as "Block ACK"). FIG. 6 is a diagram illustrating the transmission of a downlink OFDMA data unit 200 by an AP, and the transmission of ACKs 204 by client stations in response to the downlink OFDMA data unit 200, according to an embodiment. In the scenario illustrated in FIG. 6, four client stations successfully received data transmitted in the downlink OFDMA data unit 200. In response, each of the four client stations transmits an ACK 204 simultaneous with the transmission of the other ACKs 204. The ACKs are transmitted after a short inter-frame space (SIFS) interval. In the IEEE 802.11n Standard, SIFS is specified as 16 microseconds, but any suitable SIFS period can be utilized, depending on the particular implementation. In an embodiment, the downlink OFDMA data unit 200 and the ACKs 204 are transmitted in a time period reserved for OFDMA transmissions in the WLAN. According to an embodiment, client stations transmit ACKs/NAKs by an uplink OFDMA data unit, which will be discussed in more detail below. Each client station transmits the ACK 204 in a different OFDM sub-channel block.

In one embodiment, each client station determines when to transmit an ACK/NAK based on a determined duration of the OFDMA data unit 200. As discussed above with respect to FIG. 4, the AP can provide information in the OFDMA data unit 200 that indicates the duration of the OFDMA data unit 200, and a client station can use this information to determine when to transmit the ACK 204. In another embodiment, the AP assigns a time slot to the client stations in which each client station can transmit an ACK/NAK. For example, a MAC unit in the AP can signal, in an OFDMA data unit previous to the OFDMA data unit 200, the time period in which the client stations are to transmit ACKs/NAKs.

Figure 7:
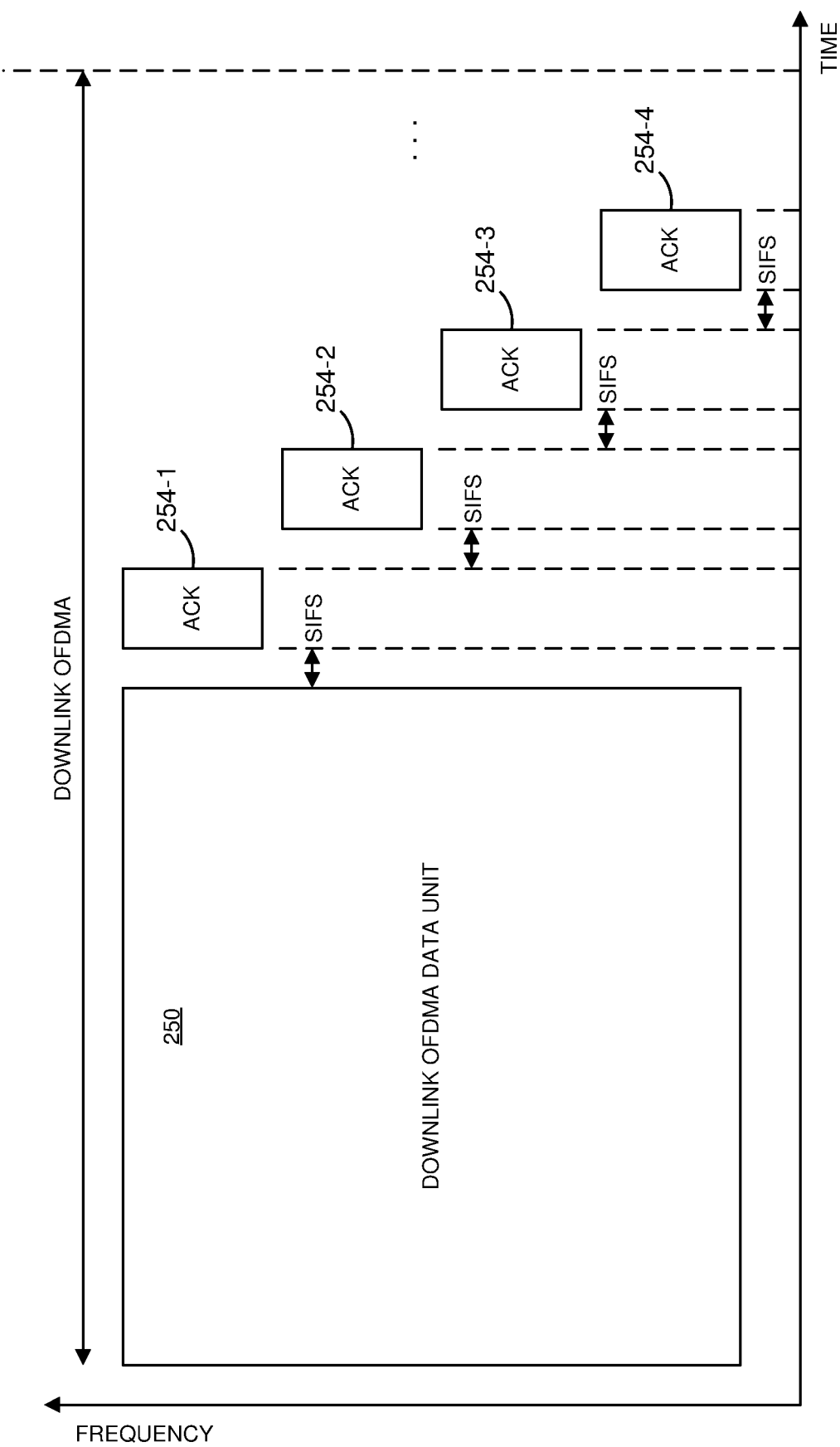
FIG. 7 is a diagram illustrating the transmission of a downlink OFDMA data unit by an AP, and the transmission of ACKs by client stations in response to the downlink OFDMA data unit, according to another embodiment.

FIG. 7 is a diagram illustrating the transmission of a downlink OFDMA data unit 250 by an AP, and the transmission of ACKs 254 by client stations in response to the downlink OFDMA data unit 250, according to an embodiment. In the scenario illustrated in FIG. 7, four client stations successfully received data transmitted in the downlink OFDMA data unit 250. In response, each of the four client stations transmits an ACK 254 at different specified times. The downlink OFDMA data unit 250 and the ACKs are transmitted in a time period reserved for OFDMA. A MAC unit of the AP has signaled each of the client stations providing each client station with an indication of the time at which the client station can transmit an ACK/NAK. For example, according to an embodiment, the MAC unit of the AP provides ACK/NAK time slot information to the client stations when providing information regarding the reserved time period for OFDMA.

The ACKs are spaced by SIFS intervals. In an embodiment, the downlink OFDMA data unit 250 and the ACKs 254 are transmitted in a time period reserved for OFDMA transmissions in the WLAN. According to an embodiment, client stations transmit ACKs/NAKs by an uplink OFDMA data unit, which is discussed in more detail below. Each client station transmits the ACK 254 in a different OFDM sub-channel block.

In an embodiment, the AP assigns the time slots to the client stations in which each client station can transmit the ACKs/NAKs. For example, a MAC unit in the AP can signal, in an OFDMA data unit previous to the OFDMA data unit 250, the time period in which a client stations is to transmit an ACK/NAK.

In another embodiment, ACKs/NAKs are transmitted by the client stations after receiving a plurality of downlink OFDMA data units (referred to as "Block ACK"). In this embodiment, a client station determines when to transmit a Block ACK based on determining a duration of a downlink OFDMA data unit or transmits in a time slot assigned by the AP, for example.

In an embodiment, the downlink OFDMA signal is configured to be received and decoded by a legacy client station (e.g., a client station configured to communicate according to the IEEE 802.11a Standard and/or the IEEE 802.11n Standard). In an embodiment, the AP does not signal to at least the legacy client stations that an OFDMA data unit is an OFDMA signal (as opposed to an OFDM data unit according to the legacy protocol (e.g., the IEEE 802.11a Standard and/or the IEEE 802.11n Standard). In an embodiment, at least OFDM sub-channel blocks corresponding to legacy client stations have the same duration as the downlink OFDMA signal so that ACKs/NAKs transmitted by the legacy client station occur at appropriate times with respect to the OFDMA data unit.

FIG. 8 is a flow diagram of an example method 300 that is implemented by an AP in a WLAN, according to an embodiment. At block 304, a plurality of different OFDM sub-channel blocks are assigned to a plurality of different client stations. At block 308, a plurality of independent data streams (i.e., the streams include different data) are received, wherein each data stream corresponds to a respective client station, and the data streams are to be transmitted to the client stations. At block 312, downlink OFDM data units are generated such that the plurality of independent data streams are modulated in respective OFDM sub-channel blocks. In an embodiment, generating downlink OFDM data units comprises including an indication in a downlink OFDM data unit that the data unit is an OFDMA data unit (i.e., the data unit includes multiple OFDM sub-channel blocks corresponding to different client stations. In an embodiment, generating downlink OFDM data units comprises including an indication in an OFDM sub-channel block of a duration of a downlink OFDM data unit (i.e., an indication of a duration of the longest duration OFDM sub-channel block in the OFDMA data unit) separate from an indication of the duration of the OFDM sub-channel block. According to an embodiment, the indication of the duration of the downlink OFDM data unit includes an indication of a rate and an indication of a length corresponding to the longest duration OFDM sub-channel block in the OFDMA data unit.

At block 316, the AP transmits the OFDM data units generated at block 312.

FIG. 9 is a flow diagram of an example method 350 that is implemented by an AP in a WLAN, according to an embodiment. In an embodiment, the method 350 is implemented in conjunction with the method 300 of FIG. 8.

At block 354, the AP determines a time period that is reserved for downlink OFDMA signals. In one embodiment, the AP also determines a time or times at which client stations can transmit ACKs/NAKs or Block ACKs in response to downlink OFDMA data units.

At block 358, the AP transmits to the client stations data indicative of the time period determined at block 354. In one embodiment, the AP also transmits data indicative of the time or times at which client stations can transmit ACKs/NAKs or Block ACKs in response to downlink OFDMA data units.

Figure 10:
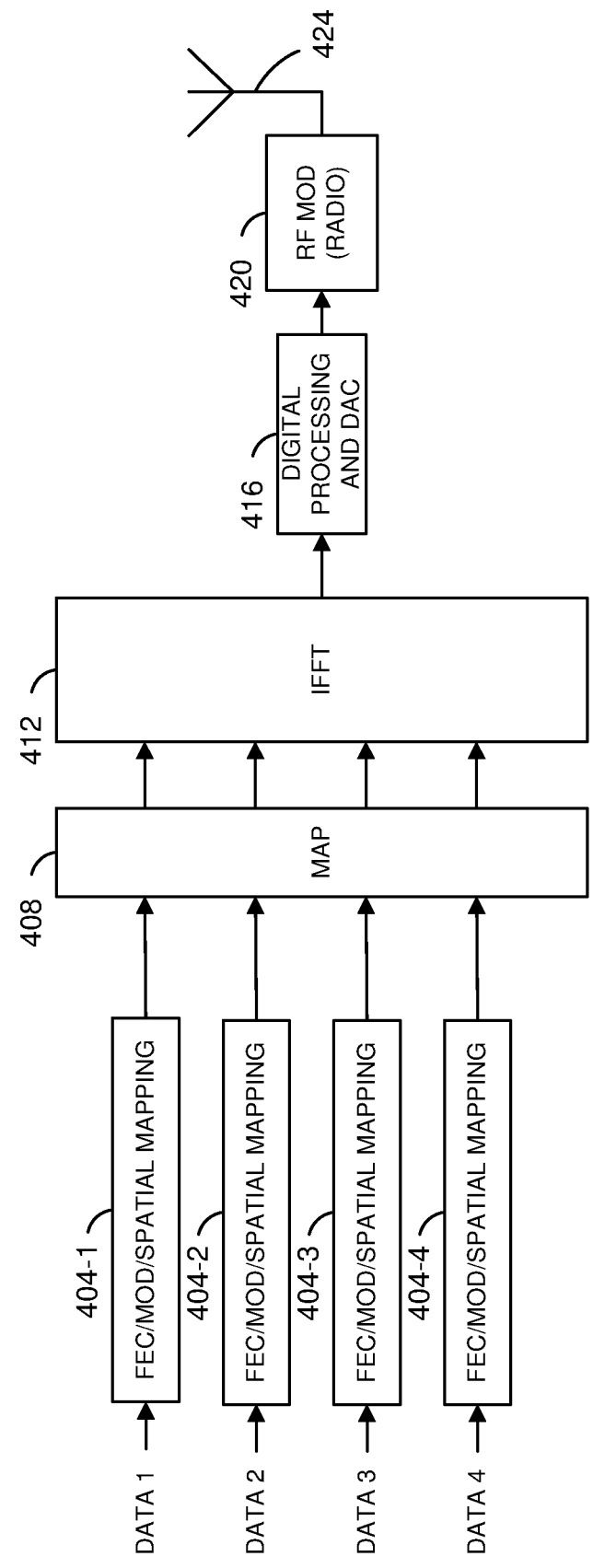
FIG. 10 is a block diagram of an example physical layer (PHY) unit of an AP, according to an embodiment.

FIG. 10 is a block diagram of an example PHY unit 400 of an AP, according to an embodiment. Referring again to FIG. 1, the PHY unit 20 of the AP 14 includes the PHY unit 400 of FIG. 10, in an embodiment.

The PHY unit 400 includes a plurality of processing blocks 404. In an embodiment, each processing block 404 performs forward error correction (FEC) encoding, modulation, and spatial mapping functions in a manner the same as or similar to such functions described in the IEEE 802.11a Standard and/or the IEEE 802.11n Standard. In FIG. 10, four processing blocks 404 are illustrated. In other embodiments, a different number of processing blocks 404 are included. For example, in one embodiment, a single processing block 404 is time-shared to process multiple data streams received in parallel.

The processing blocks 404 receive a plurality of independent data streams to be transmitted to a plurality of client devices. In the embodiment of FIG. 10, each processing block 404 processes a different one of the independent data streams and generates a plurality of constellation points corresponding to a plurality of OFDM sub-channels.

Outputs of the processing blocks 404 are provided to a mapping unit 408. The mapping unit 408 concatenates constellation points from the processing blocks 404 into a larger width OFDM symbol. For example, if the output of each processing block 404 corresponds to a 20 MHz wide (64-point inverse fast Fourier transform (IFFT)) OFDM symbol, then the mapping unit 408 concatenates the outputs of the processing blocks 404 into an 80 MHz wide (256-point IFFT). As another example, if the output of each processing block 404 corresponds to a 40 MHz wide (128-point IFFT) OFDM symbol, then the mapping unit 408 concatenates the outputs of the processing blocks 404 into a 160 MHz wide (512-point IFFT).

An IFFT unit 412 generates a time-domain signal from the output of the mapping unit 408. In an embodiment, the IFFT unit 412 has a width larger than in a typical AP configured to implement the IEEE 802.11a Standard and/or the IEEE 802.11n Standard. In one embodiment, the IFFT unit 412 implements a 256-point IFFT. In another embodiment, the IFFT unit 412 implements a 512-point IFFT. In another embodiment, the IFFT unit 412 implements a suitable width IFFT other than a 256-point IFFT or a 512-point IFFT.

A digital processing and digital-to-analog converter (DAC) block 416 processes the output of the IFFT unit 412 and generates an analog signal. In an embodiment, the digital processing and DAC block 416 includes a guard interval insertion unit. In another embodiment, the digital processing and DAC block 416 includes a windowing unit to smooth edges of each OFDM symbol. In an embodiment, the digital processing and DAC block 416 is configured to process signals with a larger bandwidth as compared to a similar processing block in a typical AP configured to implement the IEEE 802.11a Standard and/or the IEEE 802.11n Standard. In one embodiment, the digital processing and DAC block 416 is configured to process signals with a bandwidth of 80 MHz. In another embodiment, the digital processing and DAC block 416 is configured to process signals with a bandwidth of 160 MHz. In another embodiment, the digital processing and DAC block 416 is configured to process signals with a bandwidth different than 80 MHz or 160 MHz.

A radio frequency (RF) modulation block 420 generally upconverts the output of the digital processing and DAC block 416 to generate an RF signal, which is transmitted by an antenna 424. In an embodiment, the RF modulation block 420 is configured to process signals with a larger bandwidth as compared to a similar RF block in a typical AP configured to implement the IEEE 802.11a Standard and/or the IEEE 802.11n Standard. In one embodiment, the RF modulation block 420 is configured to process signals with a bandwidth of 80 MHz. In another embodiment, the RF modulation block 420 is configured to process signals with a bandwidth of 160 MHz. In another embodiment, the RF modulation block 420 is configured to process signals with a bandwidth different than 80 MHz or 160 MHz.

In an embodiment, the PHY unit 400 is a sub-unit in a MIMO PHY unit. In this embodiment, the MIMO PHY unit includes a plurality of digital processing and DAC blocks 416 and a plurality of RF modulation blocks 420 corresponding to a plurality of antennas 424. In another embodiment, the MIMO PHY unit includes a plurality of mapping units 408 and a plurality of IFFT units 412 corresponding to a plurality of transmit chains. In this embodiment, each processing block 404 generates a plurality of outputs corresponding to a plurality of spatially mapped transmit chain signals. In another embodiment, the MIMO PHY unit includes a beamforming unit.

Figure 11:
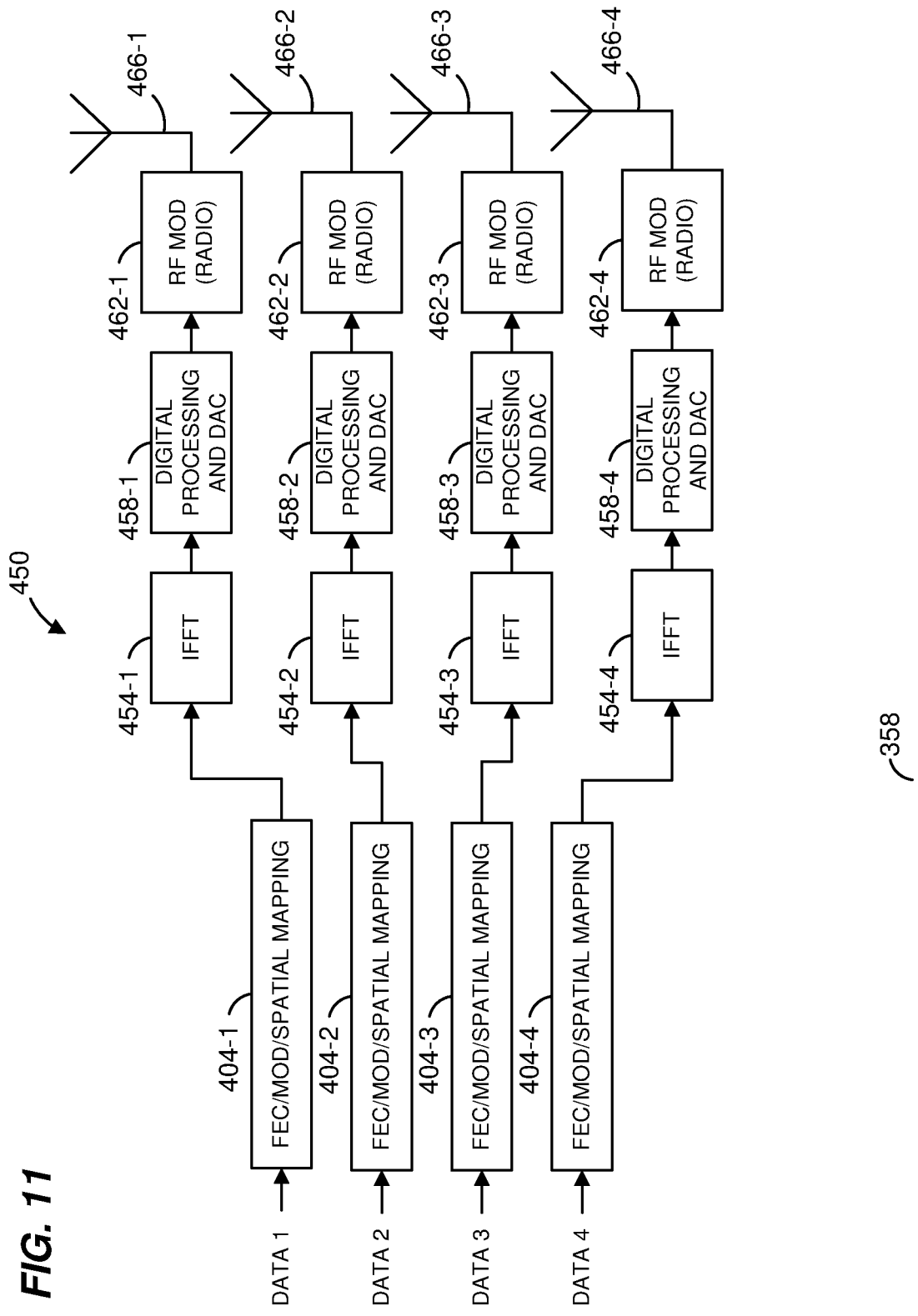
FIG. 11 is a block diagram of an example physical layer (PHY) unit of an AP, according to another embodiment.

FIG. 11 is a block diagram of an example PHY unit 450 of an AP, according to another embodiment. Referring again to FIG. 1, the PHY unit 20 of the AP 14 includes the PHY unit 450 of FIG. 11, in an embodiment.

The PHY unit 450 includes the plurality of processing blocks 404 of FIG. 10. A plurality of IFFT units 454 generate time-domain signals from the outputs of the processing blocks 404. In an embodiment, each IFFT unit 454 has a width such as in a typical AP configured to implement the IEEE 802.11a Standard and/or the IEEE 802.11n Standard. In one embodiment, each IFFT unit 454 implements a 64-point IFFT. In another embodiment, each IFFT unit 454 implements a 128-point IFFT. In another embodiment, each IFFT unit 454 implements a suitable width IFFT other than a 64-point IFFT or a 128-point IFFT.

A plurality of digital processing and DAC blocks 458 process the outputs of the IFFT units 454 and generate corresponding analog signals. In an embodiment, each digital processing and DAC block 458 includes a guard interval insertion unit. In another embodiment, each digital processing and DAC block 458 includes a windowing unit to smooth edges of each OFDM symbol. In an embodiment, each digital processing and DAC block 458 is configured to process signals having a bandwidth such as in a typical AP configured to implement the IEEE 802.11a Standard and/or the IEEE 802.11n Standard. In one embodiment, each digital processing and DAC block 458 is configured to process signals with a bandwidth of 20 MHz. In another embodiment, each digital processing and DAC block 458 is configured to process signals with a bandwidth of 40 MHz. In another embodiment, each digital processing and DAC block 458 is configured to process signals with a bandwidth different than 20 MHz or 40 MHz.

A plurality of RF modulation blocks 462 generally upconvert the outputs of the digital processing and DAC block 458 to generate RF signals, which are transmitted by respective antennas 466. In an embodiment, each RF modulation block 462 is configured to process signals having a bandwidth such as in a typical AP configured to implement the IEEE 802.11a Standard and/or the IEEE 802.11n Standard. In one embodiment, each RF modulation block 462 is configured to process signals with a bandwidth of 20 MHz. In another embodiment, each RF modulation block 462 is configured to process signals with a bandwidth of 40 MHz. In another embodiment, each RF modulation block 462 is configured to process signals with a bandwidth different than 20 MHz or 40 MHz.

In an embodiment, the PHY unit 450 is a sub-unit in a MIMO PHY unit. In one embodiment, the MIMO PHY unit includes an additional set of one or more of the IFFT units 454, the digital processing and DAC blocks 458, and the RF modulation blocks 462 for each of a plurality of transmit chains. In one embodiment, the MIMO PHY unit includes a beamforming unit.

In one embodiment, the AP utilizes a single MAC address for the different OFDM sub-channel blocks. In an embodiment, the AP includes a MAC unit that includes a plurality of transmit/receive processing blocks corresponding to the plurality of client devices with which the AP is communicating using OFDMA signals such as described above. The plurality of transmit/receive processing blocks in the MAC unit process the independent data streams simultaneously and/or in parallel.

In an embodiment, a client station that supports OFDMA signaling as described above includes a modified PHY unit (as compared to a PHY unit configured to operate according to the IEEE 802.11a Standard and/or the IEEE 802.11n Standard). For example, the modified PHY unit is configured to determine when a received data unit is within an OFDMA data unit, according to an embodiment. For instance, the PHY unit examines the L-SIG and/or HT-SIG "reserved" bits to detect an OFDMA data unit, in an embodiment. As another example, the modified PHY unit is configured to determine when an OFDMA data unit will end, as opposed to an OFDM sub-channel block within the OFDMA data unit that corresponds to the client station, according to an embodiment. For instance, the PHY unit examines the Length and Rate subfields in the L-SIG field to determine a duration of the OFDMA data unit for purposes of determining when to transmit an ACK/NAK, in an embodiment.

In an embodiment, a client station that supports OFDMA signaling as described above includes a modified MAC unit (as compared to a MAC unit configured to operate according to the IEEE 802.11a Standard and/or the IEEE 802.11n Standard). For example, the modified MAC unit is configured to interpret MAC signals from the AP regarding when the client can transmit ACKs/NAKs or Block ACKs, according to an embodiment. As another example, the modified MAC unit is configured to interpret MAC signals from the AP regarding periods reserved for OFDMA signals.

In an embodiment, a combination of PHY and MAC signaling is utilized for indicating OFDMA data units, the duration of OFMDA data units, and/or reserved time slots for OFDMA signals. In this embodiment, a client station that supports OFDMA signaling as described above includes a modified PHY unit and a modified MAC unit, such as described above.

Figure 12:
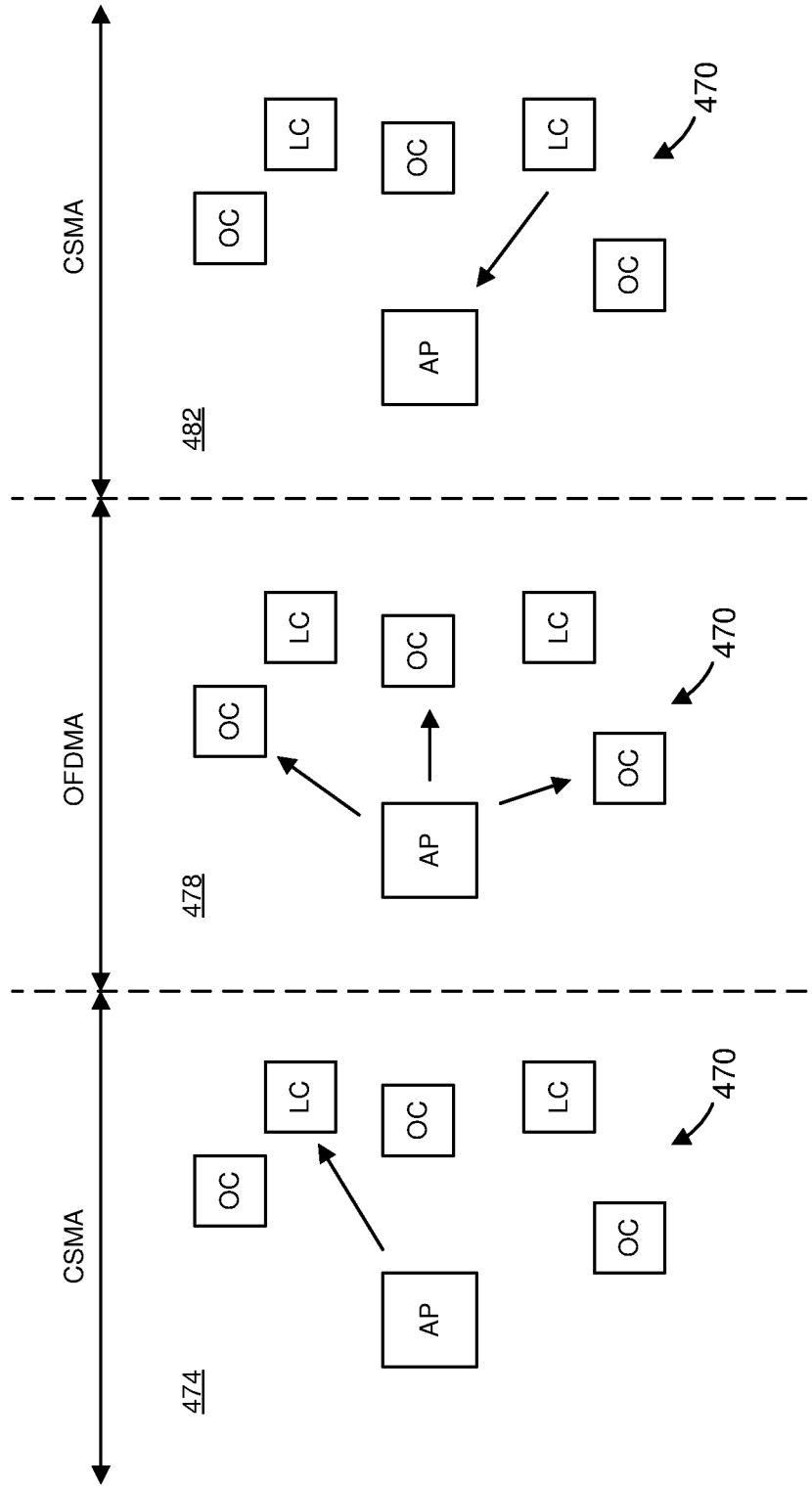
FIG. 12 is a diagram illustrating communications in a WLAN during carrier sense multiple access (CSMA) time periods and an OFDMA time period, according to an embodiment.

FIG. 12 is a diagram illustrating communications in a WLAN 470 during three time periods: a first CSMA period 474, an OFDMA time period 478, and a second CSMA period 482. In FIG. 12, time progresses from left to right so that the first CSMA period 474 occurs first, the OFDMA time period 478 occurs second, and the second CSMA period 482 occurs third. The WLAN includes an AP, a plurality of legacy client stations (LCs), and a plurality of OFDMA client stations (OC).

In the first CSMA period 474, the AP transmits a legacy downlink single to one of the LCs. The OFDMA period 478 is reserved for OFDMA signal transmissions. Thus, in the OFDMA period 478, the AP transmits a downlink OFDMA signal to a plurality of OCs. The downlink OFDMA signal includes a plurality of OFDM sub-channel blocks corresponding to the plurality of OCs. In the OFDMA period 478, the plurality of OCs also transmit ACKs/NAKs (not shown)

in response to the downlink OFDMA signal, according to an embodiment. In the second CSMA period 482, an LC transmits a legacy uplink transmission to the AP.

Embodiments of a PHY frame format for uplink OFDMA signals will now be described. In the following embodiments, OFDM sub-channel blocks have a format substantially similar to the PHY format specified in the IEEE 802.11n Standard. In other embodiments, OFDM sub-channel blocks have a format substantially similar to another communication protocol such as the PHY format specified in the IEEE 802.11a Standard or a communication protocol not yet standardized.

An uplink OFDMA signal comprises a plurality of OFDM sub-channel blocks, a plurality of which are transmitted by different client stations. In one embodiment, each OFDM sub-channel block substantially conforms to the "mixed mode" format as specified in the IEEE 802.11n Standard. In another embodiment each OFDM sub-channel block substantially conforms to the "Green field" format as specified in the IEEE 802.11n Standard. In another embodiment, the OFDM sub-channel blocks in an uplink OFDMA data unit are mixture of "mixed mode" and "Green field" substantially formatted data units.

In one embodiment, an uplink OFDMA data unit with mixed mode OFDM sub-channel blocks transmitted by the plurality of clients has a format the same as or similar to the format illustrated in FIG. 4. According to one embodiment, the L-SIG "reserved" bit is not set to indicate an OFDMA data unit. According to another embodiment, each client station sets the L-SIG "reserved" bit if the client station is aware that the OFDM sub-channel block that the client station is transmitting is part of an uplink OFDMA data unit. According to another embodiment, each client station does not set the Length and Rate subfields in the L-SIG field differently than when transmitting a CSMA signal. According to another embodiment, each client station sets Length and Rate subfields in the L-SIG field to correspond to the duration of the uplink OFDMA data unit if the client station is aware of the duration of the uplink OFDMA data unit.

In one embodiment, the AP reserves a time period for transmission of uplink OFDMA signals. In this embodiment, the AP transmits information regarding the starting time, ending time, and/or duration of the reserved time period to the client stations.

According to an embodiment, an AP capable of receiving an uplink OFDMA signal includes an RF demodulation block, an analog-to-digital converter (ADC) and processing block, and an FFT unit that are configured to process signals with a larger bandwidth as compared to similar blocks in a typical AP configured to implement the IEEE 802.11a Standard and/or the IEEE 802.11n Standard. In one embodiment, these blocks are configured to process signals with a bandwidth of 80 MHz. In another embodiment, these blocks are configured to process signals with a bandwidth of 160 MHz. In another embodiment, these blocks are configured to process signals with a bandwidth different than 80 MHz or 160 MHz.

In another embodiment, an AP capable of receiving an uplink OFDMA signal includes a plurality of RF demodulation blocks, a plurality of ADC and processing blocks, and a plurality of FFT units that are configured to process signals process signals having a bandwidth such as in a typical AP configured to implement the IEEE 802.11a Standard and/or the IEEE 802.11n Standard. In one embodiment, each such block is configured to process signals with a bandwidth of 20 MHz. In another embodiment, each such block is configured to process signals with a bandwidth of 40 MHz. In another embodiment, each such block is configured to process signals with a bandwidth different than 20 MHz or 40 MHz. In these embodiments, the plurality of blocks operate in parallel to process each OFDM sub-channel block, which has a smaller bandwidth than the uplink OFDMA signal, in parallel.

In one embodiment, the AP utilizes a single MAC address for receiving different OFDM sub-channel blocks. In an embodiment, the AP includes a MAC unit that includes a plurality of receive processing blocks corresponding to the plurality of client devices with which the AP is communicating using OFDMA signals such as described above. The plurality of receive processing blocks in the MAC unit process the independent data streams received from the client stations simultaneously and/or in parallel.

In an embodiment, an AP that supports uplink OFDMA signaling as described above includes a modified PHY unit (as compared to a PHY unit configured to operate according to the IEEE 802.11a Standard and/or the IEEE 802.11n Standard). For example, the modified PHY unit is configured to operate at a wider bandwidth as described above, according to an embodiment.

In an embodiment, an AP that supports uplink OFDMA signaling as described above includes a modified MAC unit (as compared to a MAC unit configured to operate according to the IEEE 802.11a Standard and/or the IEEE 802.11n Standard). For example, the modified MAC unit is configured to determine when the AP can transmit ACKs/NAKs or Block ACKs, according to an embodiment. As another example, the modified MAC unit is configured to reserve time periods for uplink OFDMA signals.

In an embodiment, a legacy AP is capable of receiving and decoding data transmitted in an OFDM sub-channel block by a client station as part of an uplink OFDMA signal.

In an embodiment, a client that supports uplink OFDMA signaling as described above merely implements a PHY data unit that conforms to the IEEE 802.11a Standard and/or the IEEE 802.11n Standard. In another embodiment, a client that supports uplink OFDMA signaling as described above includes a modified PHY unit (as compared to a PHY unit configured to operate according to the IEEE 802.11a Standard and/or the IEEE 802.11n Standard). For example, the modified PHY unit is configured to perform PHY signaling regarding uplink OFDMA.

In an embodiment, a client that supports uplink OFDMA signaling as described above includes a modified MAC unit (as compared to a MAC unit configured to operate according to the IEEE 802.11a Standard and/or the IEEE 802.11n Standard). For example, the modified MAC unit is configured to determine when the AP can transmit uplink signals with respect to a reserved time period for uplink OFDMA, according to an embodiment.

Figure 13:
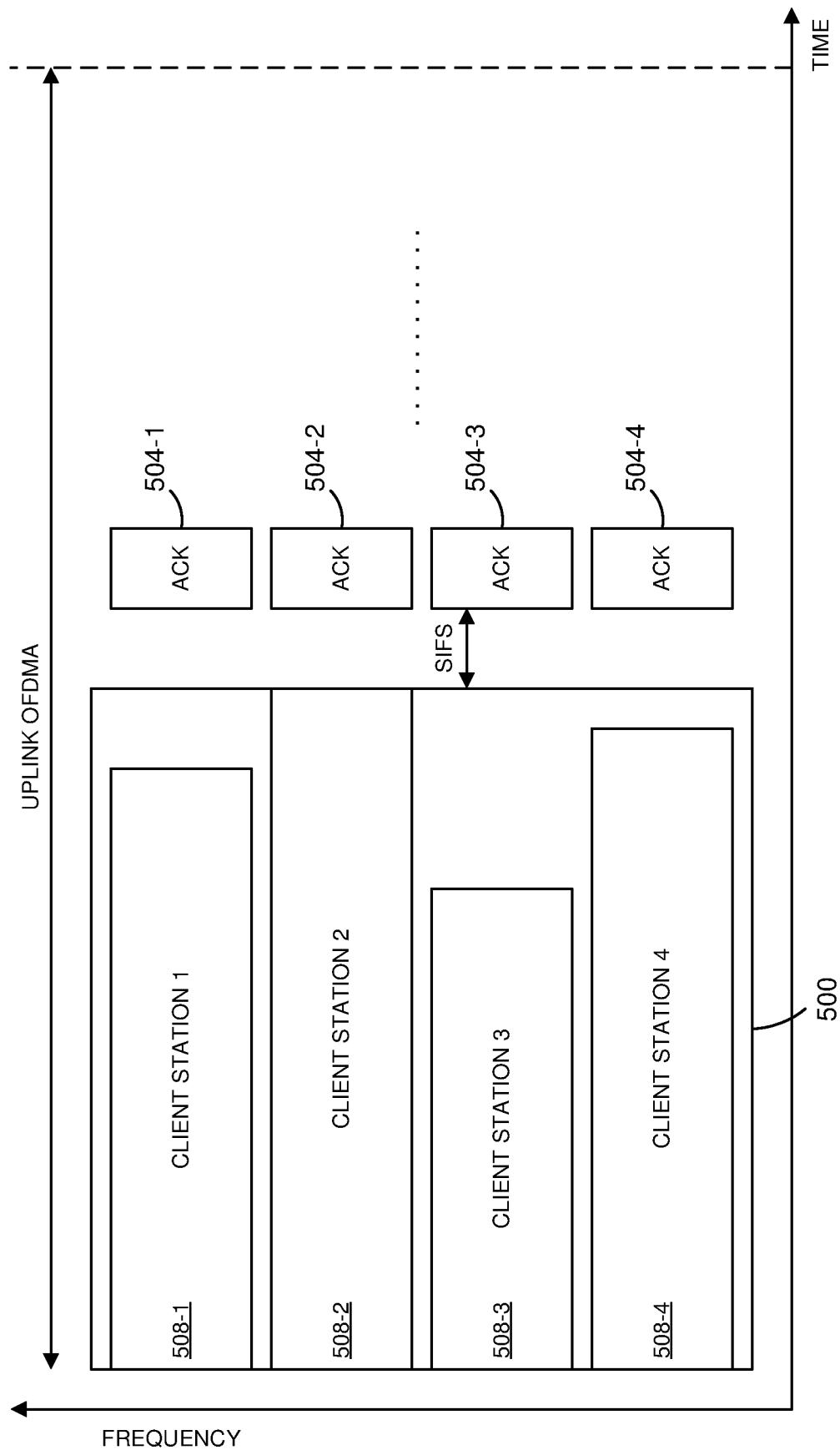
FIG. 13 is a diagram illustrating the transmission of an uplink OFDMA data unit by a plurality of client stations, and the transmission of ACKs by the AP in response to the uplink OFDMA data unit, according to an embodiment.

FIG. 13 is a diagram illustrating the transmission of an uplink OFDMA data unit 500 by a plurality of client stations, and the transmission of ACKs 504 by the AP in response to the uplink OFDMA data unit 500, according to an embodiment. In the scenario illustrated in FIG. 13, four client stations simultaneously transmit respective OFDM sub-channel blocks 508 to the AP. The OFDM sub-channel blocks 508 form the uplink OFDMA data unit 500.

In the scenario illustrated in FIG. 13, the AP successfully received each of the OFDM sub-channel blocks 508. In response, the AP transmits an OFDMA data unit that comprises ACKs 504 corresponding to different OFDM sub-channel blocks. In an embodiment, the OFDMA data unit that comprises the ACKs 504 has a format the same as or similar to a downlink OFDMA data unit as described with respect to FIG. 5, the same as or similar to a downlink OFDMA data unit as described with respect to FIG. 6, or has another suitable format.

The uplink OFDMA data unit 500 and the ACKs 504 are transmitted in a time period reserved for uplink OFDMA. A MAC unit of the AP has signaled each of the client stations providing each client station with an indication of the time at which the client station can transmit the corresponding OFDM sub-channel block 508. For example, according to an embodiment, the MAC unit of the AP provides uplink OFDMA time slot information to the client stations.

The ACKs are spaced from the OFDMA data unit 500 by a SIFS intervals. In an embodiment, a MAC unit of a client station is configured to wait, after the corresponding OFDM sub-channel block, longer than the SIFS interval for an ACK/NAK from the AP. In an embodiment, the MAC unit of the client station is configured to wait for a time out period for retransmission if an ACK/NAK from the AP is not received, wherein the time out period is longer than the SIFS interval.

In an embodiment, the AP transmits Block ACKs after receiving several uplink OFDMA data units.

Figure 14:
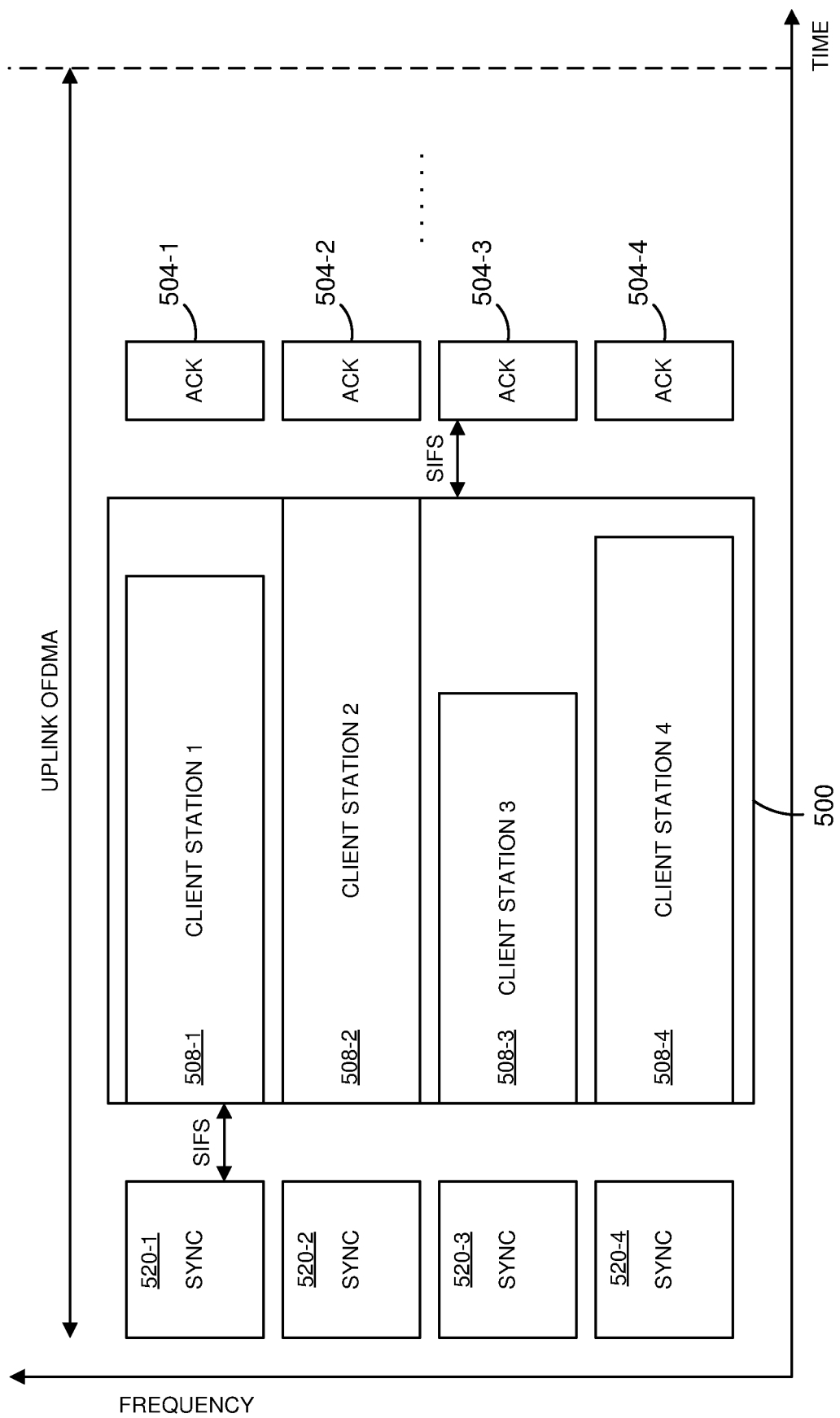
FIG. 14 is a diagram illustrating the transmission of an uplink OFDMA data unit being preceded by the AP transmitting downlink synchronization signals 520, according to an embodiment.

According to an embodiment, the AP transmits a synchronization signal to the client stations to help the client stations synchronize for transmitting an uplink OFDMA signal. In an embodiment, the synchronization signal is transmitted to the client stations as a downlink OFDMA signal. FIG. 14 is a diagram illustrating the transmission of the uplink OFDMA data unit 500 being preceded by the AP transmitting downlink synchronization signals 520, according to an embodiment. In an embodiment, the synchronization signals 520 are transmitted to the client stations as a downlink OFDMA signal. The synchronization signals 520 have the same duration, according to an embodiment.

In the embodiment according to FIG. 14, each client station transmits the corresponding OFDM sub-channel block 508 at a determined time duration after receiving the corresponding synchronization signal 520.

Figure 15:
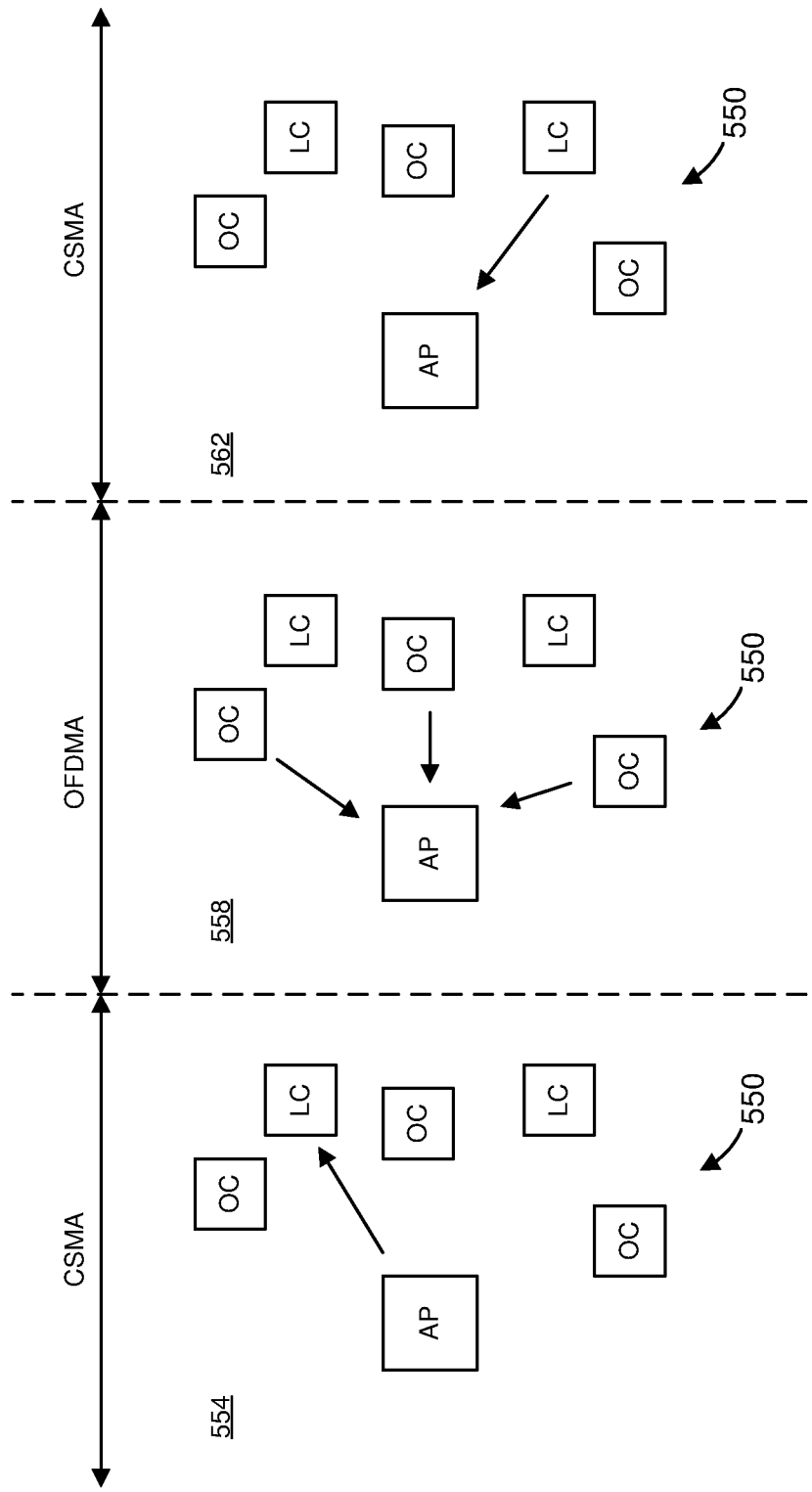
FIG. 15 is a diagram illustrating communications in a WLAN during CSMA time periods and an OFDMA time period, according to an embodiment.

FIG. 15 is a diagram illustrating communications in a WLAN 550 during three time periods: a first CSMA period 554, an OFDMA time period 558, and a second CSMA period 562. In FIG. 15, time progresses from left to right so that the first CSMA period 554 occurs first, the OFDMA time period 558 occurs second, and the second CSMA period 562 occurs third. The WLAN includes an AP, a plurality of legacy client stations (LCs), and a plurality of OFDMA client stations (OC).

In the first CSMA period 554, the AP transmits a legacy downlink single to one of the LCs. The OFDMA period 558 is reserved for uplink OFDMA signal transmissions. Thus, in the OFDMA period 558, a plurality of OCs transmit an uplink OFDMA signal to the AP. The uplink OFDMA signal includes a plurality of OFDM sub-channel blocks corresponding to the plurality of OCs. In the OFDMA period 558, the AP also transmits ACKs/NAKs (not shown) in response to the uplink OFDMA signal, according to an embodiment. According to an embodiment, in the OFDMA period 558, the AP also transmits synchronization signals (not shown) prior to the uplink OFDMA signal. In the second CSMA period 562, an LC transmits a legacy uplink transmission to the AP.

According to some embodiments, the above discussed OFDMA techniques are utilized in combination with simultaneous downlink transmission (SDT) techniques and simultaneous uplink transmission (SUT) techniques described in U.S. patent application Ser. No. 14/175,526, entitled "Access Point with Simultaneous Downlink Transmission of Independent Data for Multiple Client Stations," filed on Jul. 18, 2008, and U.S. patent application Ser. No. 14/175,501, entitled "Wireless Network with Simultaneous Uplink Transmission of Independent Data from Multiple Client Stations," filed on Jul. 18, 2008. Both of U.S. patent application Ser. No. 14/175,526 and U.S. patent application Ser. No. 14/175,501 are hereby expressly incorporated by reference herein in their entireties.

Figure 16:
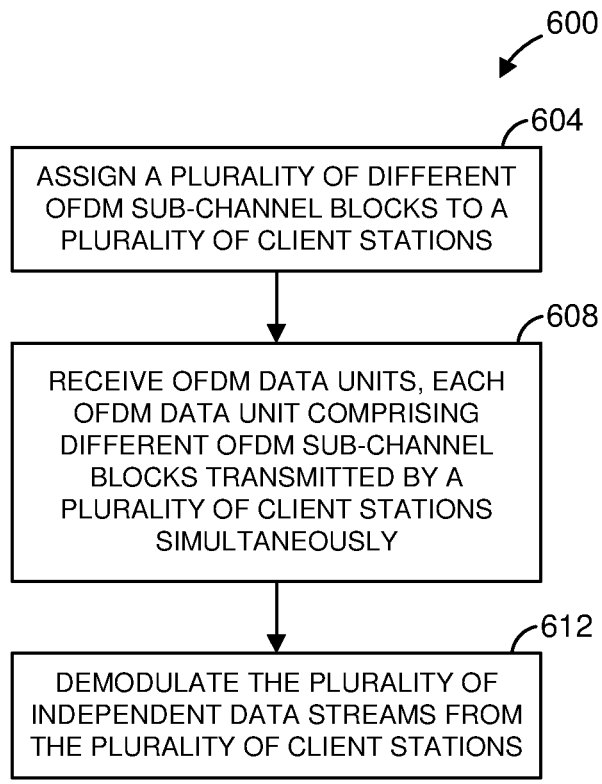
FIG. 16 is a flow diagram of an example method that is implemented by an AP in a WLAN, according to an embodiment.

FIG. 16 is a flow diagram of an example method 600 that is implemented by an AP in a WLAN, according to an embodiment. At block 604, a plurality of different OFDM sub-channel blocks are assigned to a plurality of different client stations. At block 308, OFDM data units are received, wherein each OFDM data unit comprises a plurality of different OFDM sub-channel blocks transmitted by the plurality of client stations simultaneously. In an embodiment, a plurality of independent data streams are modulated in respective OFDM sub-channel blocks.

At block 612, the plurality of independent data streams are demodulated.

In another embodiment, the method includes transmitting a synchronization signal from the AP prior to receiving each OFDM signal at block 608.

Figure 17:
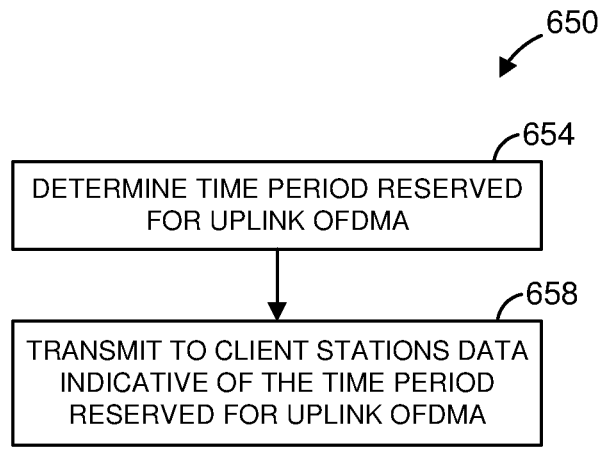
FIG. 17 is a flow diagram of another example method that is implemented by an AP in a WLAN, according to an embodiment.

FIG. 17 is a flow diagram of an example method 650 that is implemented by an AP in a WLAN, according to an embodiment. In an embodiment, the method 650 is implemented in conjunction with the method 600 of FIG. 16.

At block 654, the AP determines a time period that is reserved for uplink OFDMA signals. At block 658, the AP transmits to the client stations data indicative of the time period determined at block 654.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for transmitting to a plurality of client stations in a wireless local area network (WLAN), the method comprising:

assigning, at an access point (AP) device, respective blocks of orthogonal frequency division multiplexing (OFDM) tones to the plurality of client stations for an orthogonal frequency division multiple access (OFDMA) data unit;

receiving, at the AP device, respective independent data for the plurality of client stations;

generating, at the AP device, a preamble of the OFDMA data unit to include:

respective legacy preamble portions in respective subchannels, wherein each legacy preamble portion includes a legacy signal field that indicates a duration of the OFDMA data unit, and a non-legacy preamble portion;

generating, at the AP device, a data portion of the OFDMA data unit to include respective independent data for respective client stations, the respective independent data included within the respective blocks of OFDM tones; and transmitting, by the AP device, the OFDMA data unit.

2. The method of claim 1, wherein each legacy signal field includes a rate subfield and a length subfield set to values that indicate the duration of the OFDMA data unit.

3. The method of claim 1, further comprising:

sequentially receiving, at the AP device, acknowledgment packets from respective client stations among the plurality of client stations, the acknowledgment packets acknowledging receipt of respective independent data within the OFDMA data unit.

4. The method of claim 3, wherein:

the acknowledgment packets are received via respective subchannels.

5. The method of claim 1, wherein:

the OFDMA data unit is a downlink OFDMA data unit;

the method further comprises: receiving, at the AP device, an uplink OFDMA transmission from multiple client stations; and the uplink OFDMA transmission includes acknowledgments from multiple client stations among the plurality of client stations, the acknowledgments acknowledging receipt of respective independent data within the OFDMA data unit.

6. The method of claim 5, wherein:

the acknowledgments are received via respective subchannels, wherein each acknowledgment spans only the respective subchannel.

7. The method of claim 1, wherein each subchannel has a bandwidth of 20 MHz.

8. The method of claim 1, wherein:

assigning the respective blocks of OFDM tones comprises i) assigning a first block of OFDM tones to a first client station, and ii) assigning a second block of OFDM tones to a second client station;

a first bandwidth corresponding to the first block of OFDM tones is wider than a second bandwidth corresponding to the first block of OFDM tones;

the data portion of the OFDMA data unit is generated to include i) first independent data for the first client station within the first block of OFDM tones, and ii) second independent data for the second client station within the second block of OFDM tones.

9. The method of claim 8, wherein:

the first bandwidth corresponding to the first block of OFDM tones is 40 MHz; and the second bandwidth corresponding to the second block of OFDM tones is 20 MHz.

10. A wireless communication device, comprising:

a wireless local area network (WLAN) network interface device associated with an access point (AP) device of a WLAN, the WLAN network interface device having:

one or more integrated circuit (IC) devices, and one or more transceivers;

wherein the one or more IC devices are configured to:

assign respective blocks of orthogonal frequency division multiplexing (OFDM) tones to the plurality of client stations for an orthogonal frequency division multiple access (OFDMA) data unit, receive respective independent data for the plurality of client stations, generate a preamble of the OFDMA data unit to include:

a respective legacy preamble portion in each subchannel of a plurality of subchannels, wherein each legacy preamble portion includes a legacy signal field that indicates a duration of the OFDMA data unit, and a non-legacy preamble portion;

wherein the one or more IC devices are further configured to:

generate a data portion of the OFDMA data unit to include respective independent data for respective client stations, the respective independent data included within the respective blocks of OFDM tones, and control the one or more transceivers to transmit the OFDMA data unit.

11. The wireless communication device of claim 10, wherein the one or more IC devices are further configured to generate each legacy signal field to include a rate subfield and a length subfield set to values that indicate the duration of the OFDMA data unit.

12. The wireless communication device of claim 10, wherein the WLAN network interface device is configured to:

sequentially receive acknowledgment packets from respective client stations among the plurality of client stations, the acknowledgment packets acknowledging receipt of respective independent data within the OFDMA data unit.

13. The wireless communication device of claim 12, wherein:

the acknowledgment packets are received via respective subchannels.

14. The wireless communication device of claim 10, wherein:

the OFDMA data unit is a downlink OFDMA data unit;

the WLAN network interface device is further configured to: receive an uplink OFDMA transmission from multiple client stations; and the uplink OFDMA transmission includes acknowledgments from multiple client stations among the plurality of client stations, the acknowledgments acknowledging receipt of respective independent data within the OFDMA data unit.

15. The wireless communication device of claim 14, wherein:
the acknowledgments are received via respective subchannels, wherein each acknowledgment spans only the respective subchannel.

16. The wireless communication device of claim 10, wherein each subchannel has a bandwidth of 20 MHz.

17. The wireless communication device of claim 10, wherein:
the one or more IC devices are further configured to i) assign a first block of OFDM tones to a first client station, and ii) assign a second block of OFDM tones to a second client station;
a first bandwidth corresponding to the first block of OFDM tones is wider than a second bandwidth corresponding to the first block of OFDM tones;
the one or more IC devices are further configured to generate the data portion of the OFDMA data unit to include i) first independent data for the first client station within the first block of OFDM tones, and ii) second independent data for the second client station within the second block of OFDM tones.

18. The wireless communication device of claim 10, wherein the one or more transceivers are implemented at least partially on the one or more IC devices.

19. A method for communicating with a plurality of client stations in a wireless local area network (WLAN), the method comprising:
transmitting, by an access point (AP) device of a wireless local area network (WLAN), a synchronization signal to prompt a plurality of client stations of the WLAN to transmit as part of an uplink orthogonal frequency division multiple access (OFDMA) transmission at a time that begins a defined time period after an end of the synchronization signal; and
subsequent to transmitting the synchronization signal, receiving, at the AP device, the uplink OFDMA transmission from the plurality of client stations, wherein the OFDMA transmission is responsive to the synchronization signal, and wherein the uplink OFDMA transmission includes:
respective legacy preamble portions in respective sub-channels, wherein each legacy preamble portion includes a legacy signal field that indicates a duration of the uplink OFDMA transmission,
a non-legacy preamble portion, and
respective independent data from respective client stations among the plurality of client stations, the respective independent data included within respective blocks of orthogonal frequency division multiplex (OFDM) tones.

20. The method of claim 19, wherein each legacy signal field includes a rate subfield and a length subfield set to values that indicate the duration of the uplink OFDMA transmission.

21. The method of claim 19, further comprising:
transmitting, by the AP device, respective acknowledgments in respective subchannels in response to receiving the uplink OFDMA transmission, the respective acknowledgments acknowledging receipt of respective data within the uplink OFDMA transmission;
wherein each acknowledgment spans only the respective subchannel.

22. The method of claim 21, wherein:
transmitting the respective acknowledgments comprises transmitting, by the AP device, a downlink OFDMA data unit that includes the respective acknowledgments.

23. The method of claim 19, wherein:
each subchannel has a bandwidth of 20 MHz.

24. The method of claim 19, further comprising:
assigning, at the AP device, the respective blocks of OFDM tones to respective client stations.

25. A wireless communication device, comprising:
a wireless local area network (WLAN) network interface device associated with an access point (AP) device of a WLAN, the WLAN network interface device having:
one or more integrated circuit (IC) devices, and
one or more transceivers;
wherein the one or more IC devices are configured to:
control the one or more transceivers to transmit a synchronization signal to prompt a plurality of client stations of a WLAN to transmit as part of an uplink orthogonal frequency division multiple access (OFDMA) transmission at a time that begins a defined time period after an end of the synchronization signal;
wherein the WLAN network interface device is configured to:
subsequent to transmitting the synchronization signal, receive the uplink OFDMA transmission from the plurality of client stations, wherein the OFDMA transmission is responsive to the synchronization signal, and wherein the uplink OFDMA transmission includes:
respective legacy preamble portions in respective sub-channels, wherein each legacy preamble portion includes a legacy signal field that indicates a duration of the uplink OFDMA transmission,
a non-legacy preamble portion, and
respective independent data from respective client stations among the plurality of client stations, the respective independent data included within respective blocks of orthogonal frequency division multiplex (OFDM) tones.

26. The wireless communication device of claim 25, wherein each legacy signal field includes a rate subfield and a length subfield set to values that indicate the duration of the uplink OFDMA transmission.

27. The wireless communication device of claim 25, wherein the one or more IC devices are further configured to:
control the one or more transceivers to transmit respective acknowledgments in respective subchannels in response to receiving the uplink OFDMA transmission, the respective acknowledgments acknowledging receipt of respective data within the uplink OFDMA transmission;
wherein each acknowledgment spans only the respective subchannel.

28. The wireless communication device of claim 27, wherein the one or more IC devices are further configured to:
transmit a downlink OFDMA data unit that includes the respective acknowledgments.

29. The wireless communication device of claim 25, wherein the one or more IC devices are further configured to:

assign the respective blocks of OFDM tones to respective client stations.

30. The wireless communication device of claim 25, wherein the one or more transceivers are implemented at least partially on the one or more IC devices.

\* \* \* \* \*